(12) United States Patent
Crosswell et al.

(10) Patent No.: US 11,815,490 B2
(45) Date of Patent: *Nov. 14, 2023

(54) APPARATUS AND METHOD FOR INSPECTING A FUSION JOINT

(71) Applicant: JANA Corporation, Aurora (CA)

(72) Inventors: Dalton Crosswell, Concord (CA); Patrick Vibien, Aurora (CA); Wayne Bryce, Schomberg (CA)

(73) Assignee: JANA Corporation, Aurora (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/821,069

(22) Filed: Aug. 19, 2022

(65) Prior Publication Data

US 2023/0051399 A1    Feb. 16, 2023

Related U.S. Application Data

(63) Continuation of application No. 16/289,559, filed on Feb. 28, 2019, now Pat. No. 11,467,130.

(Continued)

(51) Int. Cl.
*G01N 29/12* (2006.01)
*G01N 29/44* (2006.01)

(52) U.S. Cl.
CPC ......... *G01N 29/12* (2013.01); *G01N 29/4427* (2013.01); *G01N 2291/267* (2013.01)

(58) Field of Classification Search
CPC ............. G01N 29/12; G01N 29/4427; G01N 2291/267; G01N 2291/044;

(Continued)

(56) References Cited

U.S. PATENT DOCUMENTS

| 5,902,935 A | 5/1999 | Georgeson et al. |
| 8,488,871 B2 | 7/2013 | Matsumoto et al. |

(Continued)

FOREIGN PATENT DOCUMENTS

| FR | 3060121 A1 | 6/2018 |
| JP | 2003194783 A | 7/2003 |

(Continued)

OTHER PUBLICATIONS

International Search Report from corresponding PCT Application No. PCT/CA2019/050731.

(Continued)

*Primary Examiner* — Marrit Eyassu
(74) *Attorney, Agent, or Firm* — Stratford Group Ltd.

(57) ABSTRACT

A method and apparatus for inspecting a fusion joint is provided. The apparatus includes a processor, an ultrasound ("US") probe in communication with the processor, and a database comprising classification rules. The processor is configured to generate an initial set of US scanning positions about the fusion joint based on information of at least one of the US probe and the fusion joint; measure, via the US probe, a US pulse-echo spectrum from at least two of the initial US scanning positions; compare each measured US pulse-echo spectrum with one or more known US pulse-echo spectrums; classify each measured US pulse-echo spectrum according to the classification rules; and evaluate an aggregate of measured US pulse-echo spectrums to determine if the fusion joint is defective.

29 Claims, 26 Drawing Sheets

Related U.S. Application Data

(60) Provisional application No. 62/730,695, filed on Sep. 13, 2018.

(58) Field of Classification Search
CPC ........... G01N 29/4436; G01N 29/4445; G01N 29/46; B29C 65/342; B29C 65/8292; B29C 66/1122; B29C 66/5221; B29C 66/52292
USPC .......................................................... 73/588
See application file for complete search history.

(56) References Cited

U.S. PATENT DOCUMENTS

| | | | |
|---|---|---|---|
| 8,811,721 | B2 | 8/2014 | Matsumoto et al. |
| 10,857,735 | B1* | 12/2020 | Martin .................... B22F 10/28 |
| 2009/0199642 | A1* | 8/2009 | Fukutomi .............. G01N 29/07 |
| | | | 73/598 |
| 2009/0277270 | A1 | 11/2009 | Huebler et al. |
| 2011/0146407 | A1 | 6/2011 | Huebler et al. |
| 2011/0296923 | A1* | 12/2011 | Cataldo ................ G01N 29/262 |
| | | | 73/632 |
| 2012/0243771 | A1 | 9/2012 | Matsumoto et al. |
| 2016/0109410 | A1* | 4/2016 | Sasaki .................... G01N 29/11 |
| | | | 73/622 |
| 2016/0139082 | A1* | 5/2016 | Ross ................... B29C 66/1224 |
| | | | 73/588 |

FOREIGN PATENT DOCUMENTS

| | | |
|---|---|---|
| JP | 2009222408 A | 10/2009 |
| JP | 2015004669 A | 1/2015 |

OTHER PUBLICATIONS

Search Report from corresponding European Application No. 19858753.7.

Austin, R. K.: "371: Nondestructive inspection of heat fusion joints in polyethylene piping", NACE; International Corrosion Conference Series; Corrosion 1997, New Orleans, La., USA; Mar. 9-14, 1997, NACE, US; New Orleans, La., USA, vol. 371, pp. 371/1-371/5, XP009511685, ISSN: 0361-4409.

* cited by examiner

FIG. 5B

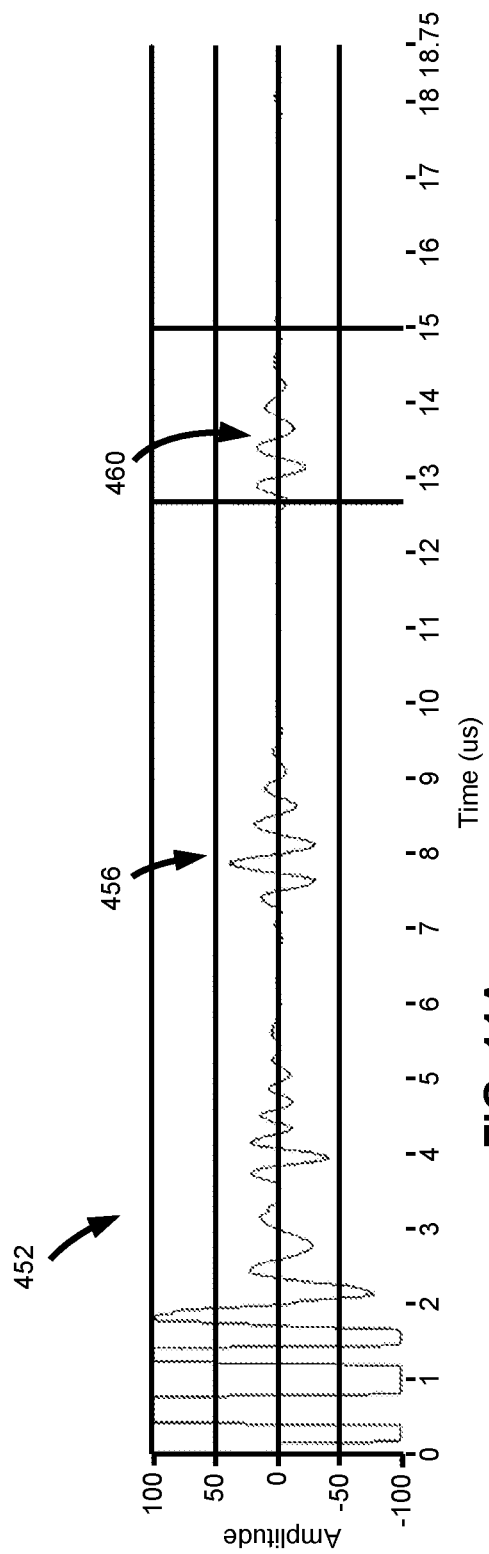
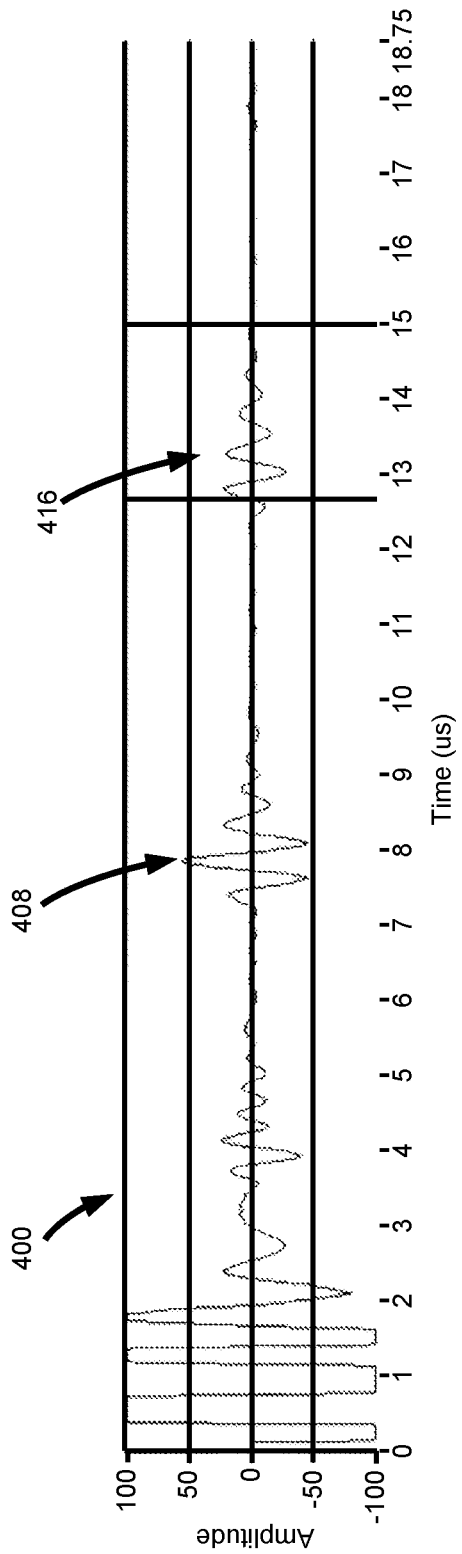
FIG. 11A
FIG. 11B

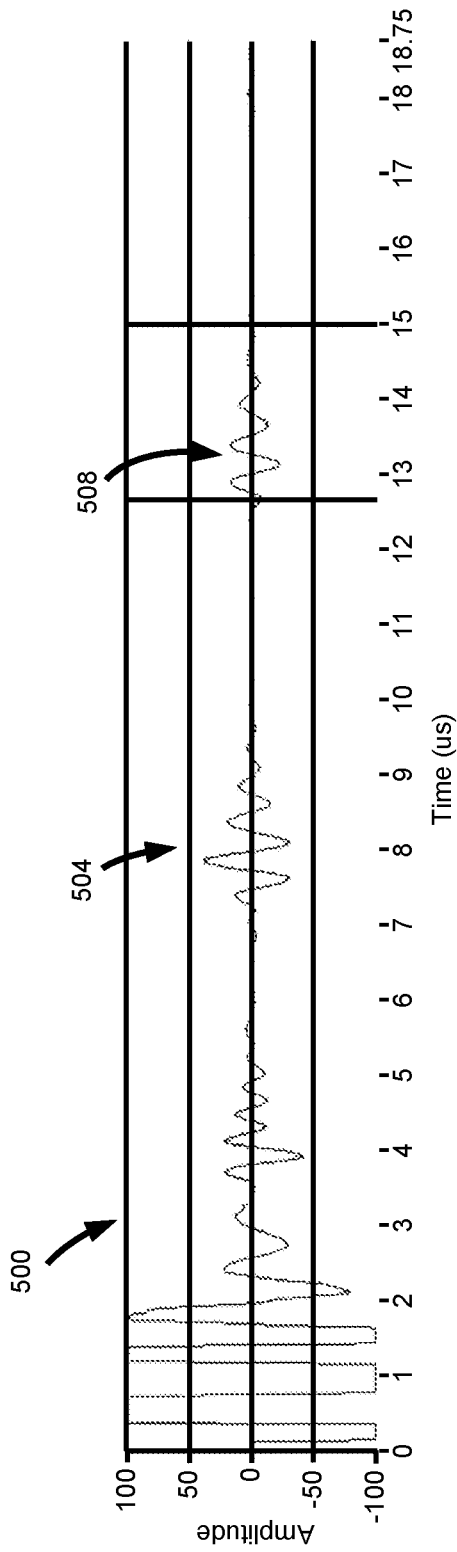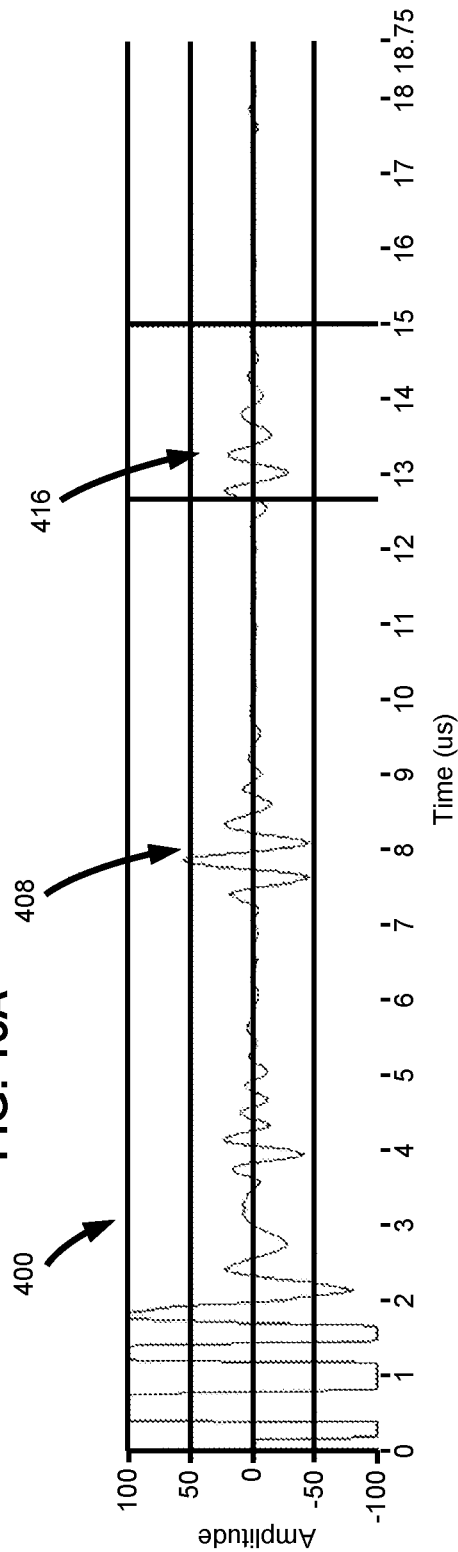
FIG. 15A
FIG. 15B

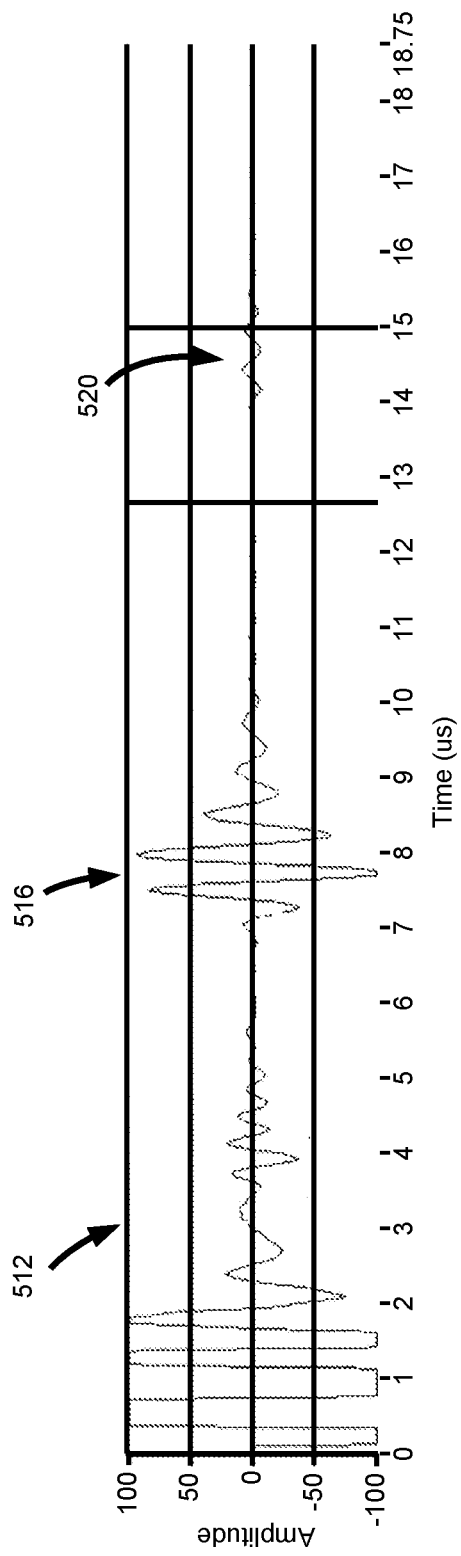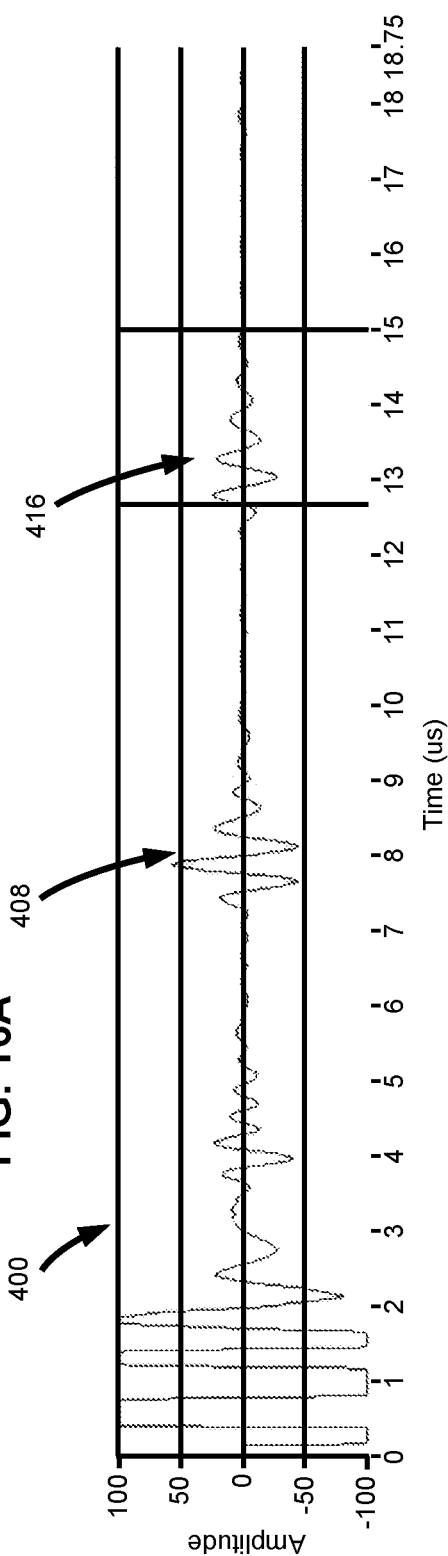
FIG. 16A
FIG. 16B

APPARATUS AND METHOD FOR INSPECTING A FUSION JOINT

CROSS-REFERENCE TO RELATED APPLICATIONS

The application is a continuation of U.S. Ser. No. 16/289,559, filed Feb. 28, 2019, now allowed, which claims priority to U.S. Ser. No. 62/730,695, filed Sep. 13, 2018, each of which is incorporated herein by reference in its entirety.

FIELD

The specification relates generally to pipes. In particular, the following relates to an apparatus and method for inspecting a fusion joint.

BACKGROUND

U.S. Pat. Nos. 8,811,721 and 8,488,871 both disclose a three-dimensional ultrasonic inspection apparatus to determine the integrity of a joined area. The apparatus comprises: an ultrasonic transducer disposed m×n piezoelectric vibrators; a signal processing unit that receives, detects an echo, and generates a three-dimensional image; a peak detecting element that detects a first peak and a second peak of an intensity distribution of the three-dimensional image data; a joint portion image creation unit to create a three-dimensional image of the joined area; a determination unit to determine whether the joined area is sound by two-step determination; and a display unit to display the three-dimensional image and the determination result, of the joined area.

United States Pub. No. 20160109410 discloses a pipe inspecting apparatus that comprises a selection module configured to select two ultrasonic optical probes from a plurality of ultrasonic optical probes attached to a pipe. The apparatus further includes a power supplying module configured to supply power to an ultrasonic transducer of one of the ultrasonic optical probes to input an ultrasonic wave from the ultrasonic transducer to the pipe and to supply the ultrasonic wave via the pipe to an optical fiber sensor of the other ultrasonic optical probe. The apparatus further includes a light detection module configured to detect laser light transmitted through the optical fiber sensor of the other ultrasonic optical probe.

SUMMARY

In one aspect, there is provided an apparatus for inspecting a fusion joint, the apparatus comprising: an ultrasound ("US") probe in communication with a processor; a database comprising classification rules; and the processor operable to: generate an initial set of US scanning positions about the fusion joint based on information of at least one of the US probe and the fusion joint; measure, via the US probe, a US pulse-echo spectrum from at least two of the initial US scanning positions; compare each measured US pulse-echo spectrum with one or more known US pulse-echo spectrums; classify each measured US pulse-echo spectrum according to the classification rules; and evaluate an aggregate of measured US pulse-echo spectrums to determine if the fusion joint is defective.

The apparatus can further comprise a display, and the processor can be further configured to identify the initial set of US scanning positions to a user via the display.

A least one adjacent pair of the initial US scanning positions can be separated by at least one width of an US beam generated by the US probe.

The processor can be further configured to add one or more new US scanning positions adjacent a US scanning position having a measured US echo-spectrum classified as anomalous.

A beam of the US probe can be perpendicular to the fusion joint. Alternatively, a beam of the US probe can be oblique to the fusion joint.

The processor can be further configured to analyze the US pulse-echo spectrums of the US scanning positions in a longitudinal row extending axially along the fusion joint to determine if the fusion joint is defective.

In addition, the processor can be further configured to identify a void in the fusion joint, as well as estimate the size of the void.

The fusion joint can be selected from the group consisting of an electrofusion joint, a butt-fusion joint and a saddle joint. Furthermore, the electrofusion joint may be an electrofusion coupling joint, an electrofusion saddle joint, an electrofusion elbow joint or an electrofusion tee joint.

Where the fusion joint is an electrofusion coupling joint or an electrofusion saddle joint; the processor can be further configured to analyze the measured US pulse-echo spectrums in at least one of a fusion zone and a cold zone to determine if the fusion joint is defective.

Where the fusion joint is an electrofusion coupling joint; the processor can be further configured to analyze the measured US pulse-echo spectrums from US scanning positions in a quadrant representing a portion of the electrofusion coupling joint between a fusion fitting and one of the pipes joined in the electrofusion coupling fusion joint in which heating wires are located, to determine if the fusion joint is defective.

With regards to evaluation of the aggregate, this can be based on a plurality of sub-tests applied to values assigned to the measured US pulse-echo spectrums. The number of sub-tests may be between four and ten. Alternatively, it may be six; greater than six; or between two and six.

In another aspect, there is provided a generating, by a processor, an initial set of US scanning positions about the fusion joint based on information of at least one of a US probe and the fusion joint; measuring, via a US probe, a US pulse-echo spectrum from at least two of the initial US scanning positions; comparing, by the processor, each measured US pulse-echo spectrum with one or more known US pulse-echo spectrums; classifying, by the processor, each measured US pulse-echo spectrum according to the classification rules; and evaluating. by the processor, an aggregate of the measured US pulse-echo spectrums to determine if the fusion joint is defective.

At least one adjacent pair of the initial US scanning positions can be separated by at least one width of an US beam generated by the US probe.

The method can further comprise adding, by the processor, one or more new US scanning positions adjacent a US scanning position having a measured US echo-spectrum classified as anomalous.

A beam of the US probe can be perpendicular to the fusion joint. Alternatively, a beam of the US probe can be oblique to the fusion joint.

The US pulse-echo spectrums of the US scanning positions in a longitudinal row extending axially along the fusion joint may be analyzed, by the processor, to determine if the fusion joint is defective.

Furthermore, the method can further comprise identifying, by the processor, a void in the fusion joint, as well as identifying a size of the void.

In the method, the fusion joint can be selected from the group consisting of an electrofusion joint, a butt-fusion joint and a saddle joint. Furthermore, the electrofusion joint may be an electrofusion coupling joint, an electrofusion saddle joint, an electrofusion elbow joint or an electrofusion tee joint.

Where the fusion joint is an electrofusion coupling joint or an electrofusion saddle joint; the method can further comprise analysis, by the processor, of the measured US pulse-echo spectrums in at least one of a fusion zone and a cold zone to determine if the fusion joint is defective.

Where the fusion joint is an electrofusion coupling joint, the method can further comprise analysis, by the processor, of the measured US pulse-echo spectrums in a quadrant representing a portion of the electrofusion coupling joint between a fusion fitting and one of the pipes joined in the electrofusion coupling joint in which heating wires are located, to determine if the fusion joint is defective.

With regards to evaluation of the aggregate, this can be based on a plurality of sub-tests applied to values assigned to the measured US pulse-echo spectrums. The number of sub-tests may be between four and ten. Alternatively, it may be six; greater than six; or between two and six.

BRIEF DESCRIPTIONS OF THE DRAWINGS

For a better understanding of the various embodiments described herein and to show more clearly how they may be carried into effect, reference will now be made, by way of example only, to the accompanying drawings in which:

FIG. 3A is a flow chart of the general method of analyzing the integrity of a fusion joint used by the apparatus of FIGS. 2A and 2B; while

FIG. 5B shows division of the fusion zones of the embodiment shown in FIG. 4A into eight quadrants;

FIG. 11A shows an US pulse-echo spectrum observed in an electrofusion coupling joint having mud or other contamination in the joint using the apparatus of FIG. 2A;

FIG. 11B shows an US pulse-echo spectrum observed in a non-defective electrofusion coupling joint, compared to FIG. 11A;

FIG. 15A shows an US pulse-echo spectrum observed in an electrofusion coupling joint where oxidation on the surface of the polymer pipe is unscraped prior to electrofusion using the apparatus of FIG. 2A;

FIG. 15B shows an US pulse-echo spectrum observed in a non-defective electrofusion coupling joint, compared to FIG. 15A;

FIG. 16A shows an US pulse-echo spectrum observed in an electrofusion coupling joint having a typical void in the joint using the apparatus of FIG. 2A;

FIG. 16B shows an US pulse-echo spectrum observed in a non-defective electrofusion coupling joint, compared to FIG. 16A;

DETAILED DESCRIPTION

Figure 1A:
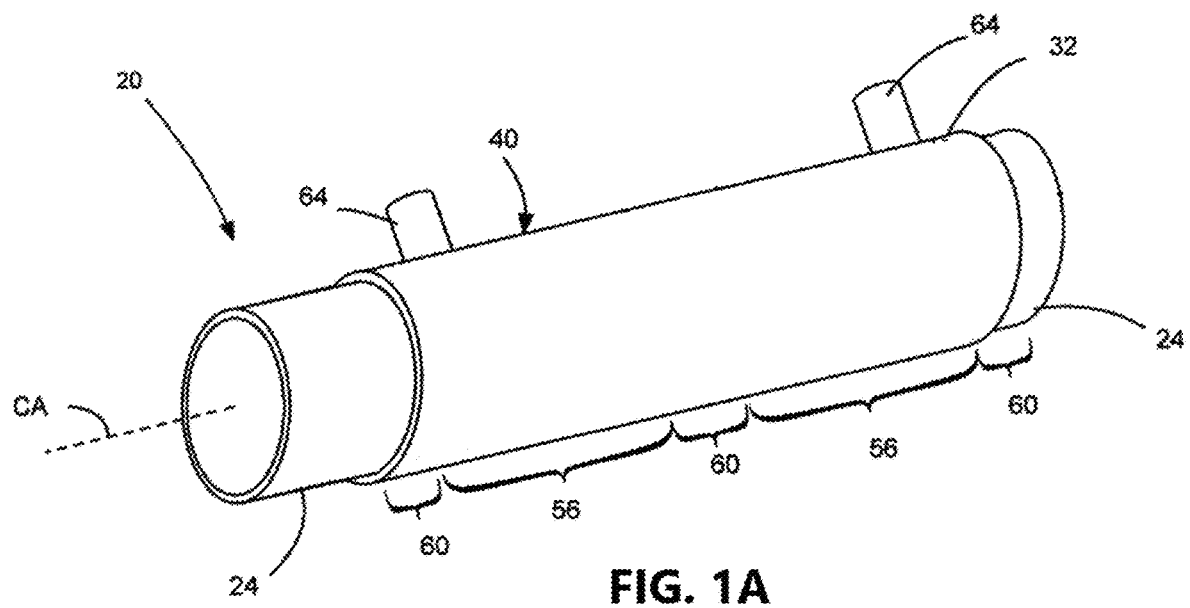
FIG. 1A illustrates a perspective view of an electrofusion fitting fused to two pipes

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

Figure 1B:
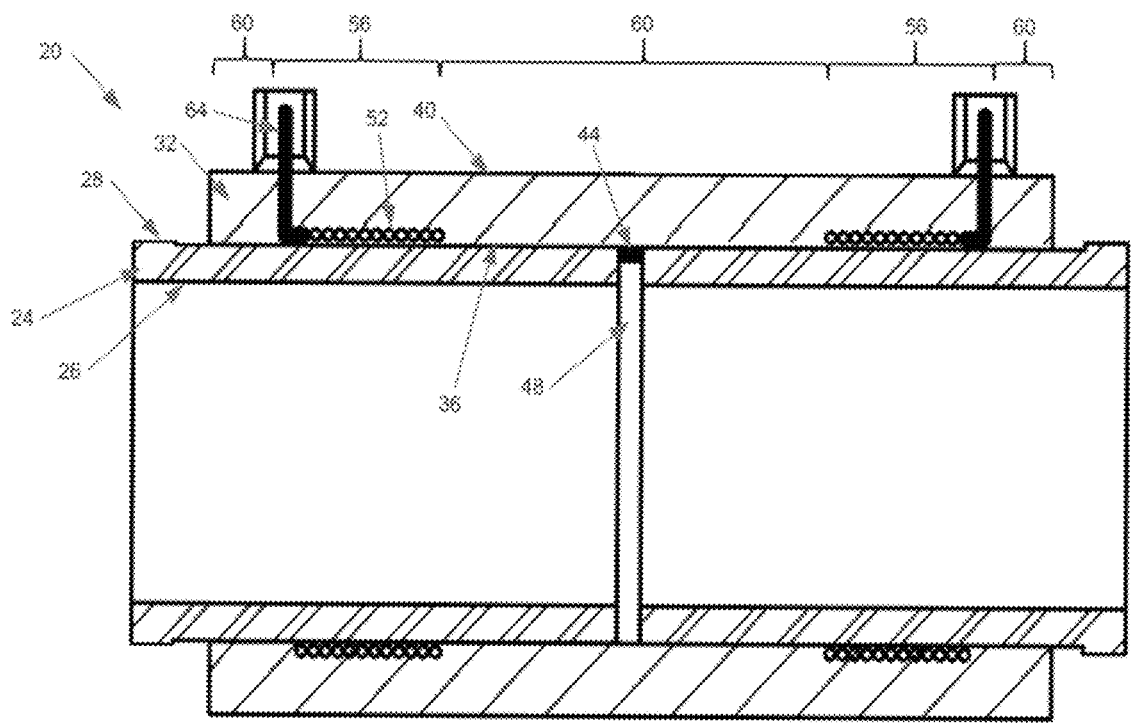
FIG. 1B shows a sectional view of FIG. 1A.

FIG. 1A illustrates a perspective view of an electrofusion fitting fused to two pipes, while FIG. 1B shows a sectional view of FIG. 1A. This is commonly referred to as an electrofusion coupling joint. Other types of electrofusion joints (e.g. electrofusion saddle joint, electrofusion elbow joint, electrofusion tee joint, etc) may also be inspected by the apparatus and method described henceforth.

In FIG. 1A, an electrofusion coupling joint 20 comprise an electrofusion fitting 32 that is fused to two pipes (each marked as 24). The pipes 24 and electrofusion fitting 32 have a common central axis CA. The electrofusion fitting 32 has an exterior surface 40. In addition, a pair of electrical connectors 64 emerge from the electrofusion fitting 32. The connectors 64 are connected to heating wires located inside the electrofusion fitting 32. Fusion zones 56 and cold zones 60 are explained further with reference to FIG. 1B.

FIG. 1B shows a sectional view of a portion of the electrofusion coupling joint 20 shown in FIG. 1A. The electrofusion coupling joint 20 is formed to join a pair of polymer pipes 24. The pipes 24 are made of polyethylene in the presently illustrated embodiment but can be made of other suitable polymers. Such pipes 24 are often situated in environments that can make it onerous to access the pipes 24. For example, the pipes 24 may be buried below ground, making the creation of a good joint particularly desirable, as the re-excavation of the pipes 24 to repair or replace the joint can be quite costly. The pipes 24 have an interior surface 26 and an exterior pipe surface 28.

An electrofusion fitting 32 spans over the pipes 24. The electrofusion fitting 32 is typically primarily made from polyethylene but can be made from various other suitable materials. The electrofusion fitting 32 has an interior surface 36 that is sized to receive the exterior pipe surface 28 of the pipes 24 snugly, and an exterior fitting surface 40. A ridge 44 extends circumferentially and centrally axially along the interior surface 36 of the electrofusion fitting 32.

When the pipes 24 are received within the interior of the electrofusion fitting 32, insertion of the pipes 24 within the electrofusion fitting 32 is limited by the ridge 44, thus resulting in a gap 48 separating the pipes 24. A set of heating wires 52 are coiled circumferentially about and adjacent to the interior surface 36. The heating wires 52 are positioned adjacent the interior surface 36 of the electrofusion fitting 32 in fusion zones 56 that are positioned close to but ending before the gap 48 between the pipes 24. Portions of the interior surface 36 of the electrofusion fitting 32 that do not have heating wires 52 are referred to as cold zones 60. One of the cold zones 60 is positioned around the gap 48 between the pipes 24 as there are no heating wires 52 immediately adjacent the gap 48. The heating wires 52 are coupled to a pair of electrical connectors 64. The heating wires 52 extend in a loop from the electrical connectors 64 to form an electrical circuit.

In order to connect the pipes 24 together, the exterior pipe surface 28 of the pipes 24 are lightly scraped to remove oxidized material from the exterior pipe surface 28 of the pipes 24. The electrofusion fitting 32 is then friction fitted over the ends of the pipes 24. The ridge 44 limits the insertion of the pipes 24 within the interior of the electrofusion fitting 32. Once the pipes 24 are deemed to be in place within the electrofusion fitting 32, an electricity source is connected to the electrical connectors 64 and a current is generated along the heating wires 52. The electrical current heats the heating wires 52 sufficiently to melt the interior surface 36 of the electrofusion fitting 32 and the exterior pipe surface 28 of the pipes 24. Once it is deemed that the interior surface 36 of the electrofusion fitting 32 has sufficiently bonded with the exterior pipe surface 28 of the pipes 24, the electrical current is terminated, and the electrical source is decoupled from the electrical connectors 64.

There are a variety of issues that can interfere with the formation of a good joint between the pipes 24 and the electrofusion fitting 32. For example, where the electric current through the heating wires 52 is interrupted, the polymers of the pipes 24 and the electrofusion fitting 32 can re-solidify prior to the formation of a good seal between them. Water, mud, and other contaminants trapped between the exterior pipe surface 28 of the pipes 24 and the interior surface 36 of the electrofusion fitting 32 can become trapped therebetween when the heating wires 52 are heated up. One or both of the pipes 24 can be misaligned with the electrofusion fitting 32 so that the central axis of the pipe(s) 24 and the central axis of the electrofusion fitting 32 are oblique to or spaced from one another, thus creating regions of the joint where gaps exist between the exterior pipe surface 28 of the pipe(s) 24 and the interior surface 36 of the electrofusion fitting 32. One or both of the pipes 24 can be under-inserted in the electrofusion fitting 32, thus causing the fusion zone of the electrofusion fitting 32 to be positioned axially along the pipe(s) 24 closer to or overlapping an end of the pipe(s) 24, potentially resulting in melted material leaking out from between the exterior pipe surface 28 of the pipe(s) 24 and the interior surface 36 of the electrofusion fitting 32. During the process of preparing the pipes 24 for the joint, the exterior pipe surface 28 of each pipe 24 can be over-scraped, resulting in poor contact between the exterior pipe surface 28 of the pipe 24 and the interior surface 36 of the electrofusion fitting 32. The pipes 24 can be moved prior to cool down of the material heated by the heating wires 52. The ovality of the pipes 24 can decrease the joint quality.

Figure 2A:
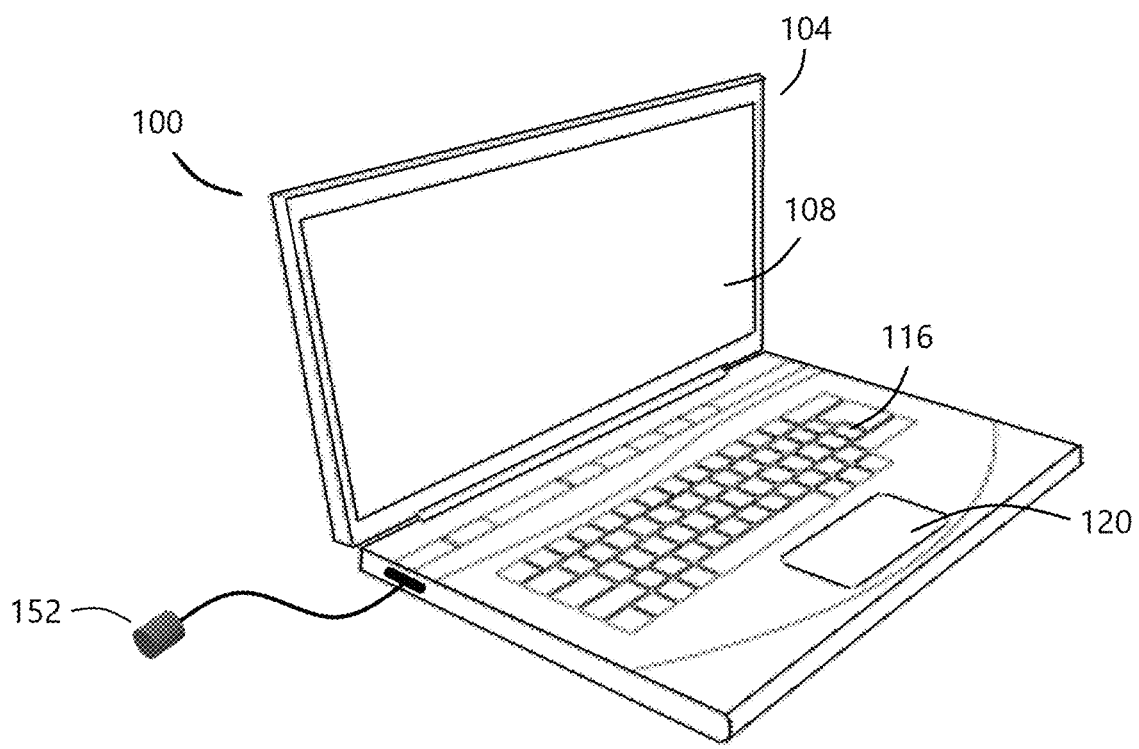
FIG. 2A shows an apparatus for inspecting a fusion joint in accordance with an embodiment.
Figure 2B:
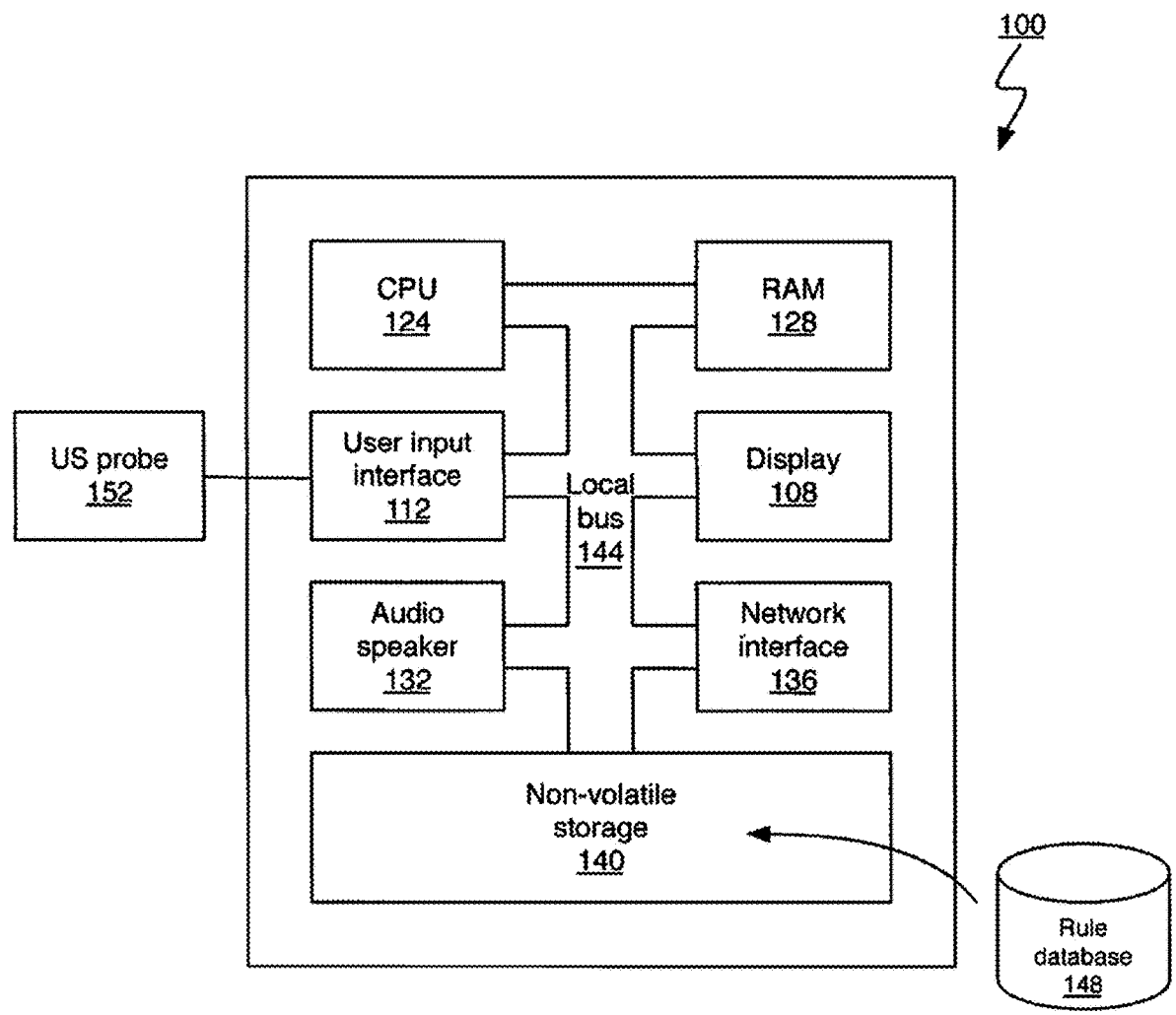
FIG. 2B is a schematic diagram of various hardware components of the apparatus of FIG. 2A.

FIGS. 2A and 2B shows an apparatus 100 for inspecting a fusion joint such as the electrofusion coupling joint 20 shown in FIG. 1 in accordance with an embodiment. The apparatus 100 uses US beams to detect changes in materials in a fusion joint. US pulse echoes returning back through the fusion joint contain a significant amount of information about the substrate through which the sound passes. Good welds with no defects produce a very distinctive sinusoidal trace. Voids will increase or decrease the amplitudes of the US pulse-echo spectrums. Contamination in the fusion joint produces unique and easily identifiable wave forms. These characteristics make US a good means for detecting anomalies in fusion joints.

The apparatus 100 can include a computing device 104 having a display 108, a user input interface 112 that includes a keyboard 116 and a trackpad 120. The computing device 104 also has at least one processor in the form of a central processing unit ("CPU") 124, random access memory ("RAM") 128, an audio speaker 132 is operable to generate audio messages and alerts for a user, a network interface 136, and non-volatile storage 140, and a local bus 144 enabling CPU 124 to communicate with the other components. CPU 124 executes at least an operating system, and a program for analyzing fusion joints. RAM 128 provides relatively responsive volatile storage to CPU 124. The user input interface 112 allows for input to be received, and outputs information to output devices, such as the display 108 and/or the audio speaker 132. The network interface 136 permits communication with other computing devices over computer networks such as the Internet. The non-volatile storage 140 stores the operating system and programs, including computer-executable instructions for implementing the fusion joint analysis. During operation of apparatus 100, the operating system, the programs and the data may be retrieved from non-volatile storage 140 and placed in RAM 128 to facilitate execution.

A classification rule database 148 is stored in the non-volatile storage 140. The classification rule database 148 stores classification rules for classifying US scanning positions.

The apparatus 100 also includes an ultrasound ("US") probe 152. The US probe 152 is an operator-manipulated device that can be positioned along an exterior of a fusion joint to transmit US pulses into the fusion joint and read the resulting US echoes. In an embodiment, the US probe 152 is placed along the exterior fitting surface 40 of the electrofusion fitting 32 to transmit US pulses into the joint 20 and read the resulting US echoes.

Typically, the US probe 152 is ¼ inch to ½ inch in diameter and generates an US beam of approximately ½ to its full diameter in diameter. While the US probe 152 is shown being coupled via cable to the computing device 104, the US probe may be wirelessly coupled to the computing device 104 or located remotely from the computing device 104 and in communication therewith over a computer network in other embodiments.

Figure 3A:
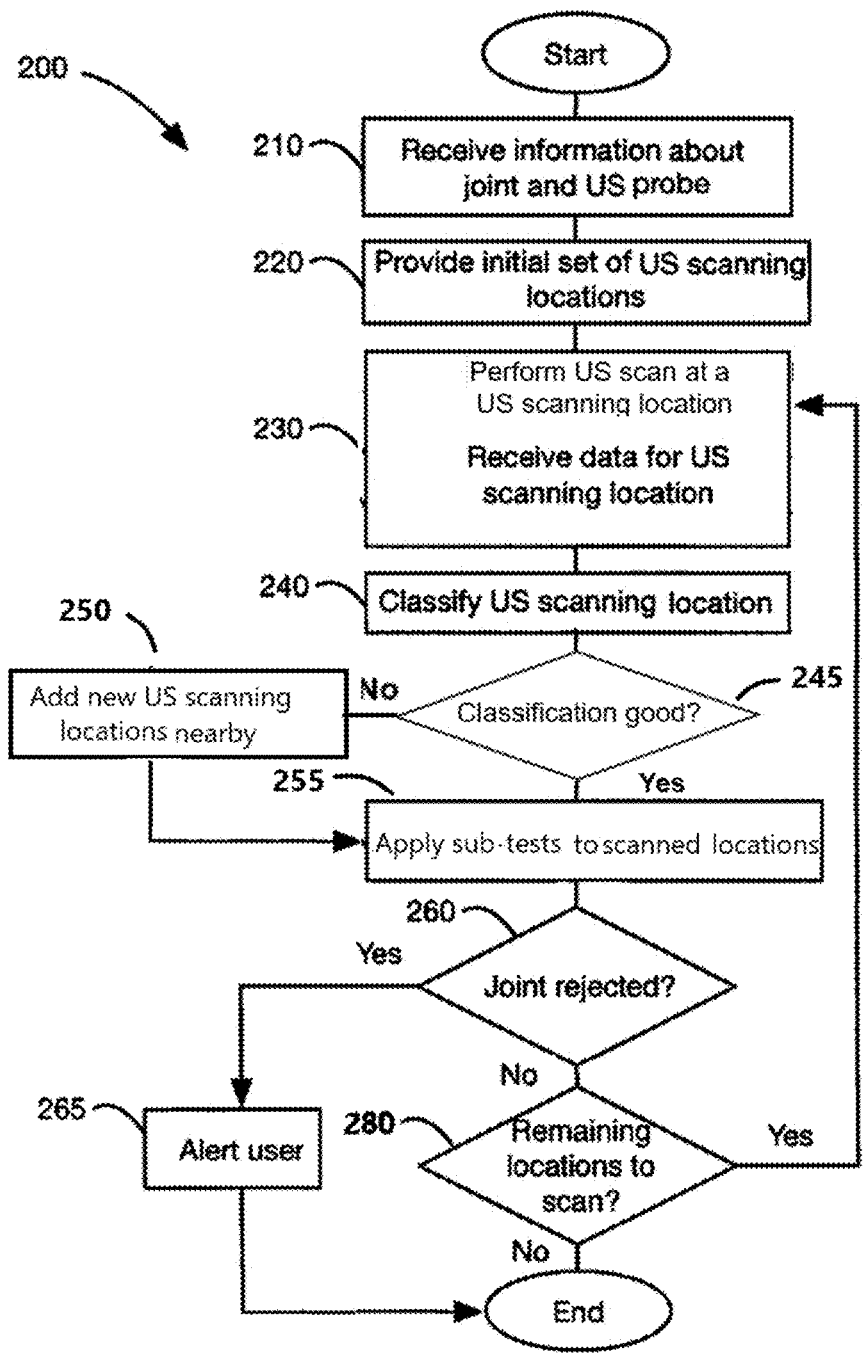

FIG. 3A shows an example of a flowchart for inspecting a fusion joint (200) using the apparatus 100. In order to determine how to analyze a particular fusion joint, information about the fusion joint and the US probe is entered into the apparatus 100 (210). The information can include the type of fusion joint, the dimensions of the fusion joint, an identifier of a particular fusion joint model, information about dimensions of a fusion zone of the fusion joint, the average heating wire depth (for electrofusion joint fittings), the size and frequency of the US probe, etc.

Based on the information about the fusion joint and US probe, an initial set of US scanning positions is provided by the apparatus (220).

The apparatus 100 establishes a series of intersecting gridlines on an area that encompasses the fusion joint. The intersecting gridlines define a plurality of cells that cover the entire area. A complete view of the state of the fusion joint may be obtained if all of these cells are scanned by the US probe. However, in order to make the analysis more efficient, the apparatus 100 selects a representative subset of all of the cells and instructs the user to scan the same. The representative subset is referred hereto as an initial set of US scanning locations. The spacing of the scanning locations in the initial set is such that the time required to scan the initial set of US scanning positions is less than that required to scan the full set of cells. Furthermore, the initial set of US scanning locations still provides a relatively good method of detecting defects that may cause the fusion joint to fail.

Once the initial set of US scanning positions are determined by the apparatus 100, the apparatus 100 selects a first unscanned cell and directs the user to obtain a US pulse-echo spectrum at that location via a visual indication on the display 108 (230).

Once US echo data is received for the US scanning position (230), the US scanning position is classified (240). The US scanning position is classified based on the actual detected US echoes versus the expected US echoes for the position and the fusion joint type.

Various approaches for determining a degree of matching between the received US pulse-echo spectrum and the expected US pulse-echo spectrum may be used.

For example, one or more rules from the rules database may be used to perform the classification. There are a number of rule sets for each US scanning position in a fusion joint. These can be accessed and modified via an admin module. The information about the US probe and the fusion zone depth is taken into consideration in determining the thresholds to evaluate the rules.

These rules effectively determine a level of match between the actual and expected data for the US scanning position. In addition, these rules can determine if a defect is present; whether the defect is a void and the size of the void.

scanning locations. In the embodiment shown in FIG. 3, these new locations are not scanned and classified immediately, but rather after step 280. However, in other embodiments, it is possible to scan and classify the new scanning locations at step 250.

Figure 3B:
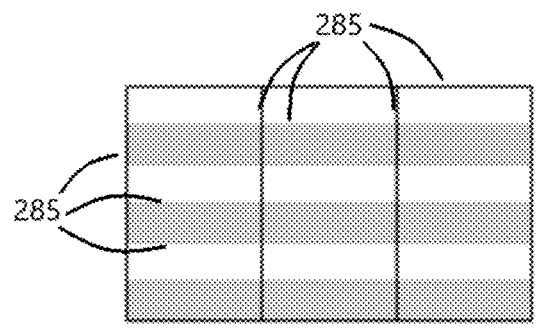
FIGS. 3B and 3C illustrate scanning positions of a hypothetical small fusion joint.
Figure 3C:
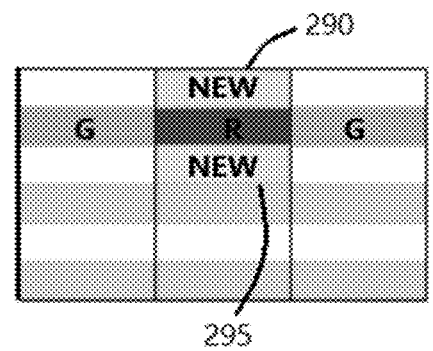

An illustrative example of steps 220 to 250 is shown in FIGS. 3B and 3C for a hypothetical small joint. The apparatus establishes intersecting gridlines 285 that cover the area of the joint, such that there are 3 columns (across the joint) and 6 rows (around the joint). This means there are a total of 18 cells that span the entire joint. In the interest of time, the software instructs the user to inspect a subset of those cells, highlighted in grey, for a total of 9 US scanning locations. That is, the initial set of US scanning locations has 9 cells.

As each of US scanning locations in the initial set is scanned, it is classified as good (G) or anomalous (R). If a scanned position is classified as bad (R), the apparatus adds new scanning positions 290 and 295, adjacent the anomalous cells. These new cells may be scanned to determine the size of the anomaly.

The apparatus then analyzes the collective results (or classifications) of the scanned locations up to this point, by applying a series of subtests (255). Upon applying the series of subtests, it is determined whether the fusion joint is rejected (260).

The classification data is prepared for evaluation by the subtests. For example, in order to calculate the percentage of anomalous readings in an area of the joint map, a value is given to each US scanning position (or cell). As an example, a CellValue(row, column) for each cell may be calculated as follows:

```
IF (Cell(x) == Red || Cell(x)== Large Void || Cell(x) ==Small Void)) { CellValue(x) = 1
}
IF (Cell(x) == Green) { CellValue(x) = 0 }
ELSEIF (Cell(x) = Yellow)
    {
    IF( (PrevHalfCell == Red || PrevHalfCell == Large Void || PrevHalfCell ==
    Small Void) &&
    (NextHalfCell == Red || NextHalfCell == Large Void || NextHalfCell == Small
    Void) )
    {CellValue(x) = 1}
    ELSEIF(PrevHalfCell ==Green && NextHalfCell == Green)
    {CellValue(x) = 0}
    ELSEIF (PrevHalfCell == Green && NextHalfCell == Yellow) || (PrevHalfCell
    == Yellow && NextHalfCell == Green)
    {CellHalfValue(x) = 0.25}
    ELSEIF ( (PrevHalfCell = Red || PrevHalfCell = Yellow) && (NextHalfCell ==
    Red || NextHalfCell == Small Void || NextHalfCell == Large Void) ||
    NextHalfCell == Yellow))
    {CellHalfValue(x) = 0.75}
    ELSE
        {CellValue(x) = 0.5}
    }
ELSE {CellValue(x) = 0}
```

The software may label US scanning positions as green, yellow and red as per the rules. In addition, where a void is clearly identified, the red is further labeled as a small void or a large void. That is, the software can return one of five results: green, yellow, red, small void, or large void.

Upon analyzing and classifying (240) the received US pulse-echo spectrum for the particular US scanning position, the apparatus checks to see if the location that has just been scanned, is anomalous or good (245). If the classification result is anomalous, new US scanning locations (near the location classified as anomalous) are added (250). These new scanning locations are still part of the plurality of cells defined by the gridlines but are outside the initial set of US That is, a cell value depends on whether the cell is classified as green, yellow or red, as well as the classification of the cells proximate the given cell.

The rejection of a fusion joint can be determined using a series of sub-tests based on the green, yellow, red and void ratings determined for each US scanning position. Each of the sub-tests is a comparison of a sub-combination of the green, yellow, red, and void ratings and a respective failure threshold. For each sub-test, if the sub-combination of the ratings is above the respective failure threshold, a flag is set—at which point, the overall test will be a fail. That is, a fusion joint is rejected if it fails any one of the sub-tests. If, instead, all sub-tests are passed, the fusion joint is not rejected thus far.

The number of subtests vary depending on the type of fusion joint that is being analyzed. While there is no upper limit to the number of subtests, in some embodiments, the number of subtests may be between two and ten; in other embodiments, the number of subtests may be between four and eight. In some embodiments, the number of subtests may be six; less than six, or greater than six. In addition, some of the sub-test values can be calculated differently for couplings and tee joints.

While, in the present embodiment, these sub-tests are calculated each time data is collected via the US probe, it can be desirable in other scenarios to reduce the frequency of these tests, such as applying once every 'n' tests; applying the sub-tests after scanning every row of US scanning positions, etc. Further, it can be advantageous to only perform a sub-set of the tests or perform a sub-set of the tests more frequently than other sub-sets of the tests.

If the fusion joint is rejected (based on the subtests), the user is alerted (265). As an example, the apparatus 100 may emit an audible tone and/or present a message on the display 108 to alert the user that the fusion joint is deemed defective. After alerting the user, the method 200 ends.

If, instead, the fusion joint is not rejected, any additional US location(s) (i.e. either from the initial set, or new locations added at step 250) that remain (280) are scanned beginning at step (230). The new US scanning positions (identified at step 250) are scanned and classified to provide information on the size of an anomaly. In the case where the anomaly is a void, classification of the new US scanning positions can indicate the size of the void. It is possible for a fusion joint to have a small, localized void, and also be deemed acceptable. However, if the void is large, then the fusion joint is deemed unacceptable.

If the fusion joint is not rejected, and no US scanning positions remain to be scanned, the program ends.

Operation of an embodiment of the apparatus is shown with reference to the electrofusion coupling joint shown in FIGS. 1A and 1B. The apparatus 100 directs a user to perform US pulse-echo spectrum observations at initial sample locations along the exterior fitting surface 40 of the electrofusion fitting 32. The sample locations, including the initial sample locations, in the present embodiment are determined by using an actual or virtual grid.

Figure 4A:
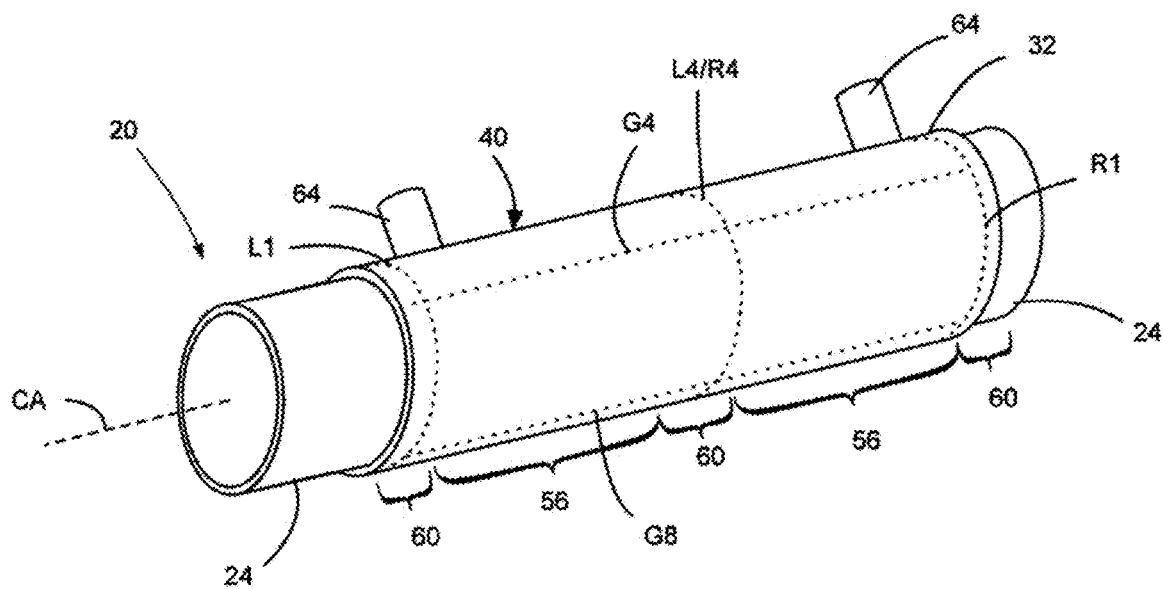
FIG. 4A illustrates a first demarcation of ultrasound ("US") scanning positions on the exterior fitting surface of the electrofusion fitting shown in FIG. 1A.

In a first approach, the apparatus 100 may direct the user to mark locations along the exterior fitting surface 40 of the electrofusion fitting 32. In particular, as shown in FIG. 4A, the apparatus 100 may direct the user to draw four equally spaced longitudinal lines along the exterior fitting surface 40 of the electrofusion fitting 32, two of which, G4 and G8, are visible. The longitudinal lines are parallel to a central axis CA of the pipes 24 and the electrofusion fitting 32. Next, the apparatus 100 may direct the user to draw a thick central circumferential line L4/R4 about the circumference of the electrofusion fitting 32, and then draw a circumferential line about the circumference of the electrofusion fitting 32 adjacent each end of the electrofusion fitting 32, L1 and R1. The apparatus 100 may then directed the user to draw additional longitudinal lines and circumferential lines about the exterior fitting surface 40 of the electrofusion fitting 32 until 16 equally spaced longitudinal lines and seven generally equally spaced circumferential lines have been drawn. Each cell marked by the intersection of the longitudinal and circumferential lines represents a location.

Depending on the size of the electrofusion fitting 32, the apparatus 100 can direct the user to provide more or fewer longitudinal and circumferential lines to demarcate locations along the exterior fitting surface 40 of the electrofusion fitting 32.

Figure 4B:
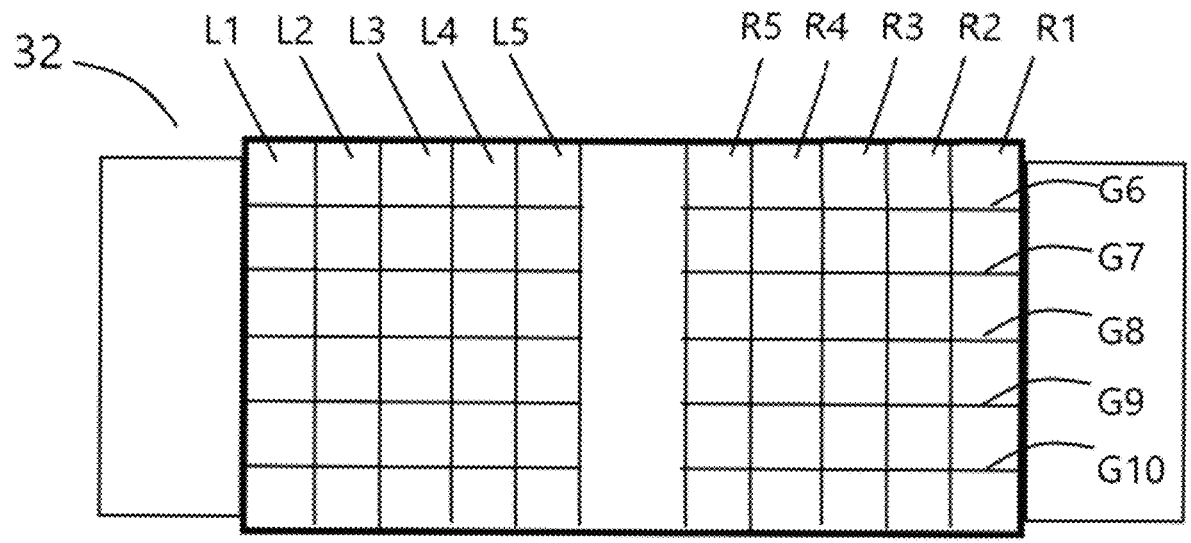
FIG. 4B illustrates a plan view of longitudinal and circumferential gridlines drawn on the exterior fitting surface of the electrofusion fitting shown in FIG. 1A.

FIG. 4B shows an electrofusion fitting after the drawing of the longitudinal and circumferential lines.

Figure 4C:
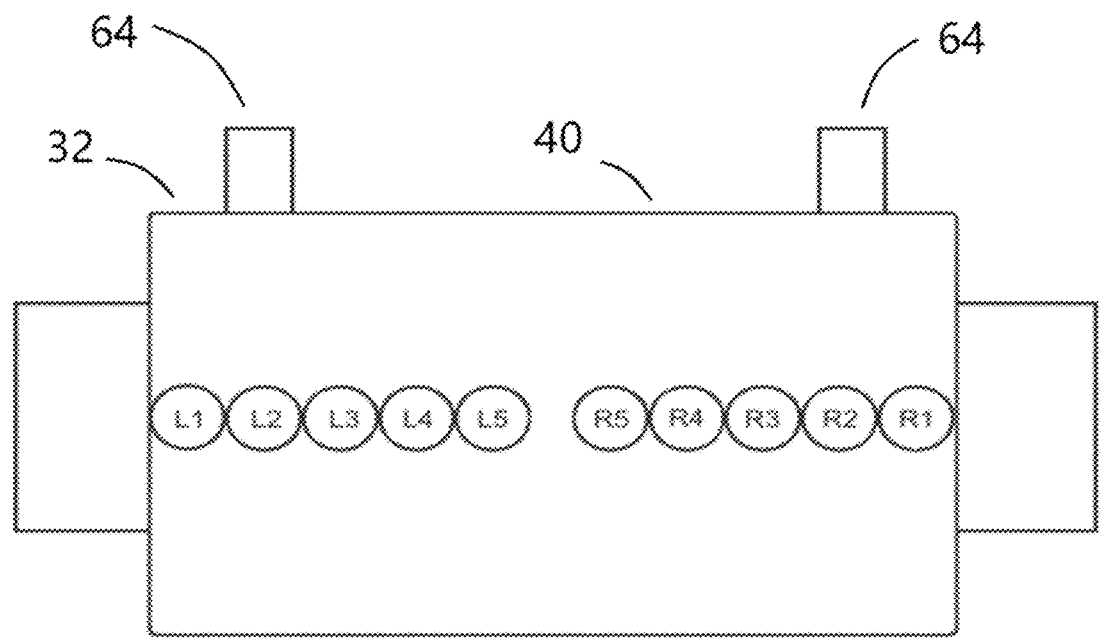
FIG. 4C illustrates virtual US scanning positions on an electrofusion fitting as drawn by the apparatus of FIGS. 2A and 2B.

FIG. 4C shows virtual locations presented on the display 108 of the apparatus 100. Where the apparatus 100 employs a camera that can image the electrofusion fitting 32, the apparatus 100 can overlay location markers on an image of the electrofusion fitting 32 presented on the display 108.

Figure 5A:
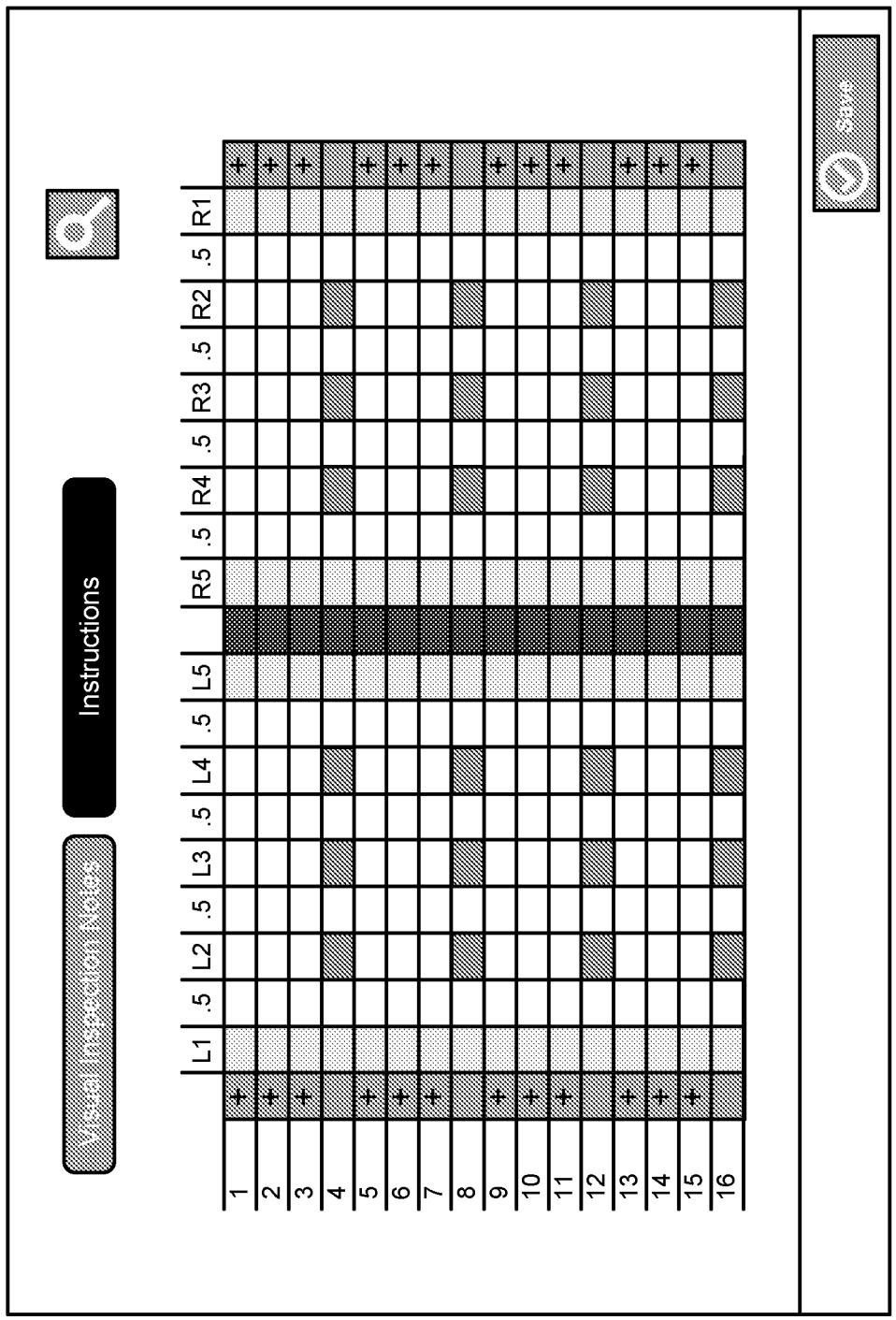
FIG. 5A shows an initial set of US scanning positions presented by the apparatus of FIGS. 2A and 2B to be scanned by a user.
Figure 5B:
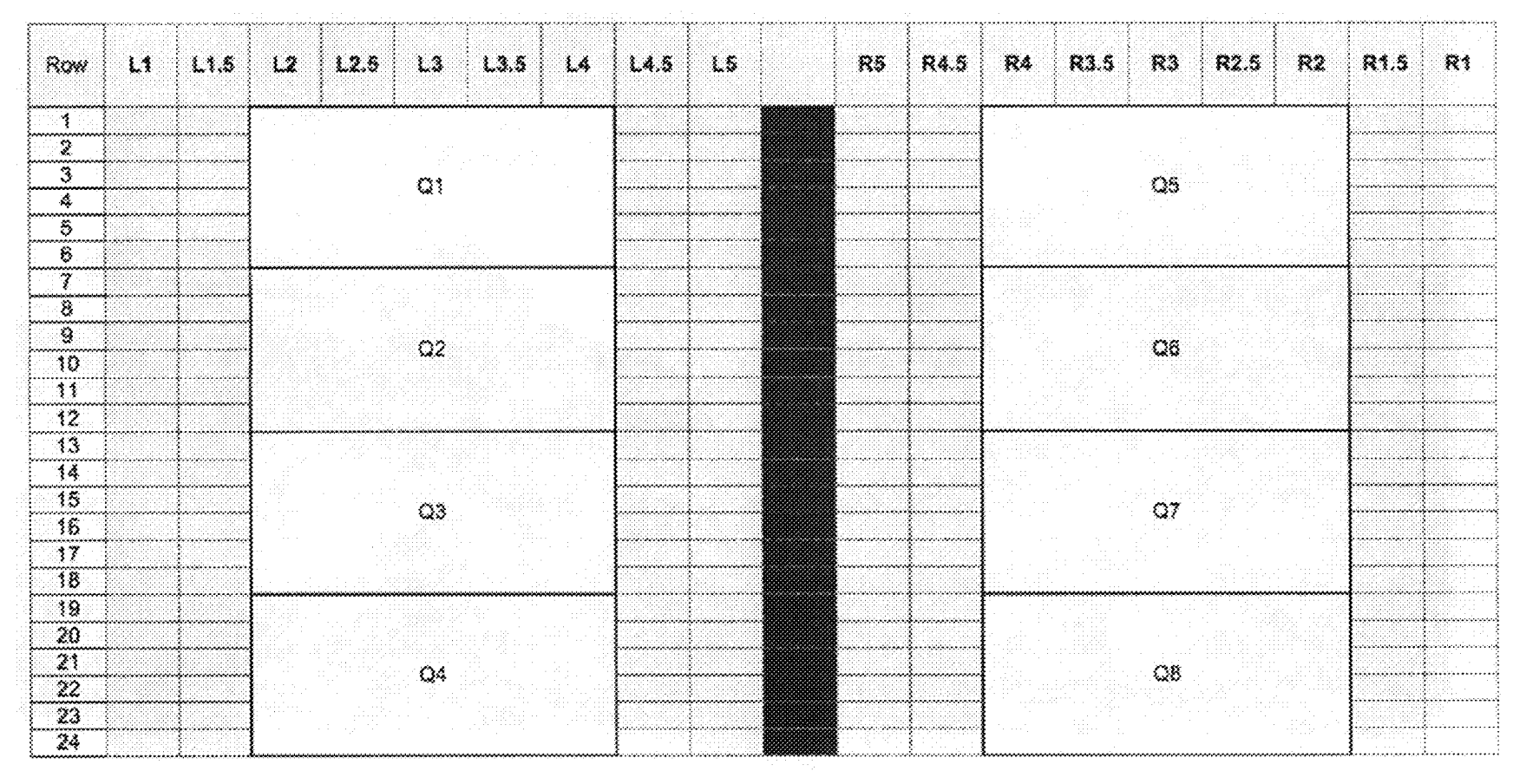

FIG. 5A shows an initial set of US scanning positions for an electrofusion coupling joint 20 presented by the apparatus 100 to the user. The set of initial US scanning positions includes three US scanning positions uniformly distributed across each fusion zone 56 (L2, L3, L4, R4, R3, and R2) along each of four evenly spaced longitudinal lines (G4, G8, G12, and G16). The four evenly spaced longitudinal lines and the center line divide the fusion zones into eight equally sized quadrants shown in FIG. 5B. The US scanning positions along L1 and R1 are positioned adjacent the ends of the electrofusion fitting 32, relatively removed from the heating wires 52. The US scanning positions along L5 and R5 are positioned adjacent the gap 48 between the pipes 24, also relatively removed from the heating wires 52. It is expected that no fusion will occur in these locations in a properly fused electrofusion coupling joint 20. The US scanning positions along L2, L3, L4, R4, R3, and R2 are positioned atop of the heating wires 52. It is thus expected that fusion will occur in these locations in a properly fused electrofusion coupling joint 20.

The initial set of US scanning positions are distributed about the exterior surface of the electrofusion coupling joint 32 and is selected so that at least some adjacent pairs of US scanning positions are separated by at least the width of the US beam generated by the US probe 152. As can be seen, the US scanning positions between the US scanning positions on columns L2 and L3 are at least the width of the US beam generated by the US probe 152. Further, the US scanning positions between the US scanning positions on rows G4 and G8 are also at least three times the width of the US beam generated by the US probe 152.

With reference to the flowchart in FIG. 3, once the initial set of US scanning positions are determined by the apparatus 100, the apparatus 100 selects a first of the list of unscanned US scanning positions and directs the user to scan the US pulse-echo spectrum at that location via a visual indication on the display 108 (230).

Figure 6:
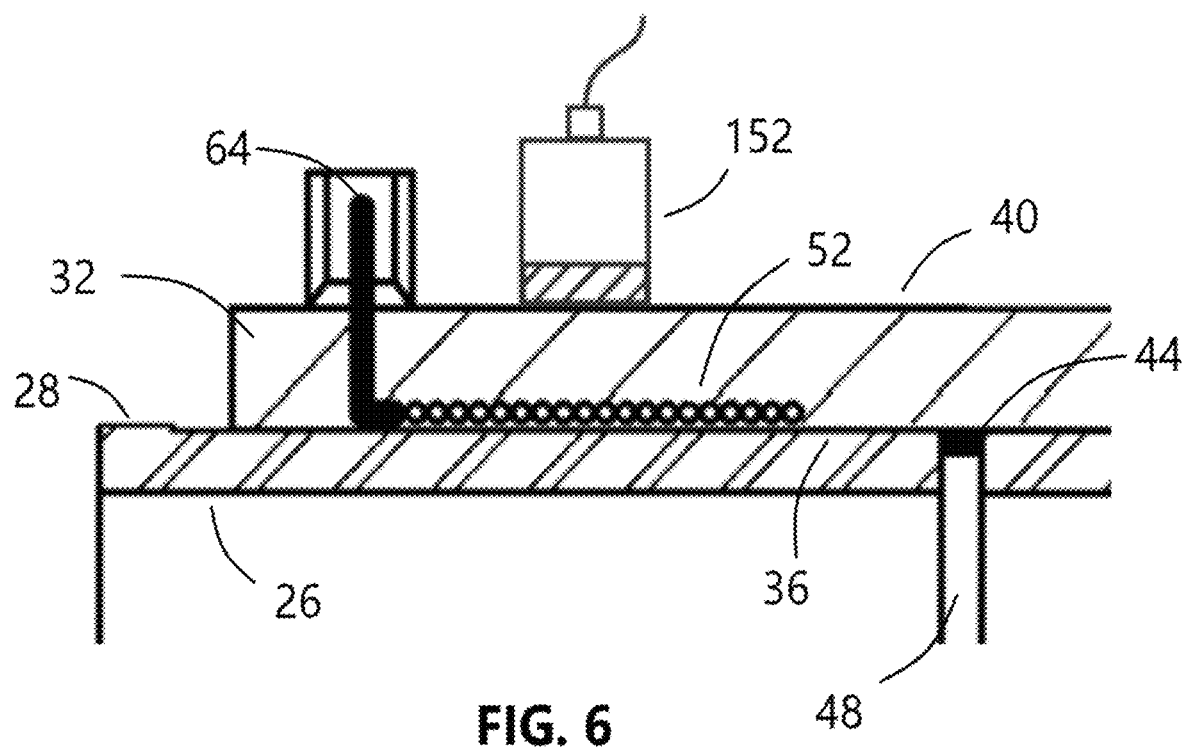
FIG. 6 shows positioning of a US probe at virtual US scanning positions of an electrofusion coupling joint under direction of the apparatus of FIGS. 2A and 2B.

FIG. 6 shows positioning of the US probe 152 to scan the initial set of virtual US scanning positions identified by the apparatus 100. The US probe 152 is manually positioned by the user at locations identified by the apparatus 100; namely, the set of initial US scanning positions. As the user is prompted to scan a US scanning position with the US probe 152, the user moves the US probe 152 to the location indicated on the display 108 of the apparatus 100 and scans the US pulse-echo spectrum at the location.

Figure 7:
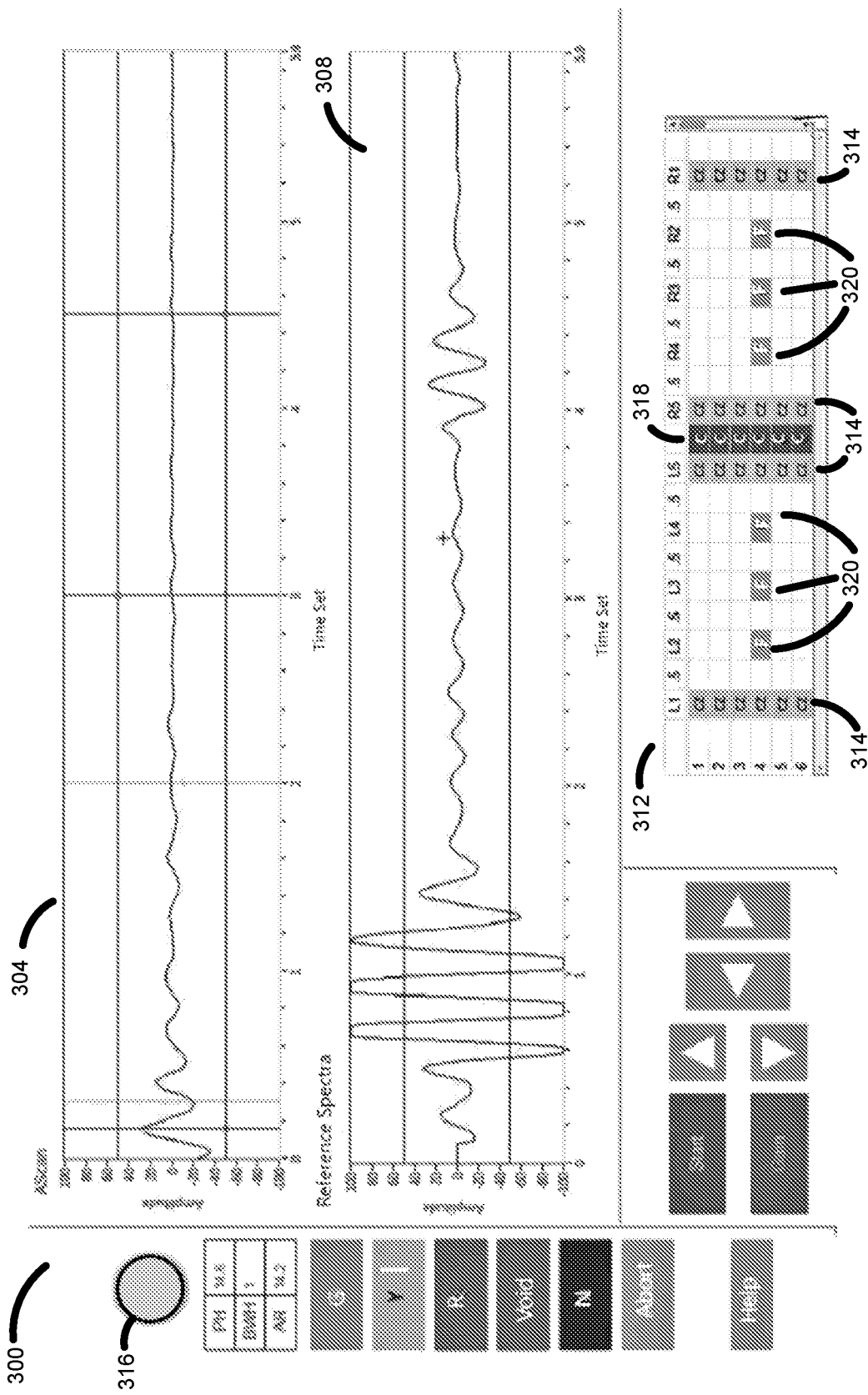
FIG. 7 shows an interface presented by the apparatus of FIGS. 2A and 2B during inspection of an electrofusion coupling joint.

FIG. 7 shows a graphical user interface ("GUI") 300 presented by the apparatus 100 during inspecting of an electrofusion coupling joint. The GUI 300 presents an amplitude scan, or A-scan, of the US pulse-echo spectrum 304 captured by the US probe 152. A reference US pulse-echo spectrum 308 is presented adjacent the US pulse-echo spectrum 304. The reference US pulse-echo spectrum 308 is the US spectrum expected for the particular US scanning position being scanned. A joint map 312 shows US scanning positions to be scanned, as well as US scanning positions that have been scanned. In the illustrated screenshot, an electrofusion coupling joint has been selected, and none of the US scanning positions (referenced by 320) have been scanned.

As each US scanning position is scanned, the US scanning positions are marked in the joint map 312 based on whether the US pulse-echo spectrum 304 corresponds sufficiently to the reference US spectrum 308; that is, whether the particular position of the fusion joint appears to be as expected. The correlation between the US pulse-echo spectrum 304 and the reference US spectrum 308 is analyzed and a result indicator 316 identifies if the US pulse-echo spectrum 304 corresponds to the reference US spectrum 308.

If the US pulse-echo spectrum 304 corresponds to the reference US spectrum 308 sufficiently, the US scanning position is marked green on the joint map 312. If it is unclear whether the US pulse-echo spectrum 304 corresponds to the reference US spectrum 308 sufficiently, the US scanning position is marked yellow on the joint map 312. Instead, if the US pulse-echo spectrum 304 does not correspond sufficiently to the reference US spectrum 308, the US scanning position is marked red on the joint map 312, signifying an anomaly.

US scanning positions 320 (labeled with "F") in the joint map 312 are identified for scanning. US scanning positions marked with black (marked with a 'C' for center in the case of an electrofusion coupling joint) in the joint map 312 are not scanned by the apparatus 100. The US scanning positions 318 (between L5 and R5) represent the center zone between the two pipes 24, and scanning positions 314 are used to identify cold zones; that is, where there are no heating wires 152.

Returning again to FIG. 3, once data is received for a US scanning position (230), the US scanning position is classified (240). The US scanning position is classified based on the actual detected US echoes versus the expected US echoes for the position and the fusion joint type. For example, for an electrofusion coupling joint, in the fusion zones, it is expected that the heating wires will heat and fuse the electrofusion fitting to the pipe. In the cold zones, it is expected that no fusion will occur and that no material will be displaced from the fusion zones into the cold zones.

Figure 8:
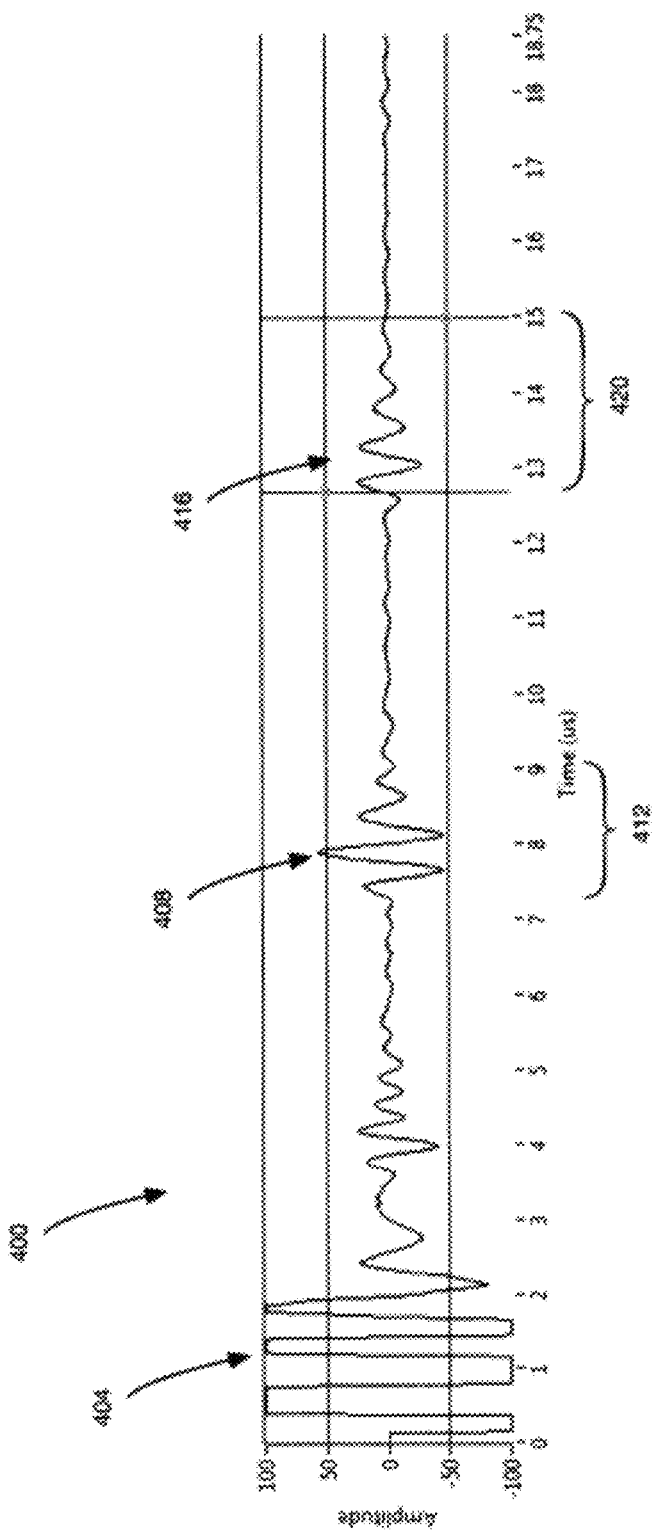
FIG. 8 shows a typical US pulse-echo spectrum observed in a non-defective electrofusion coupling joint using the apparatus of FIG. 2A.

FIG. 8 shows a typical US pulse-echo spectrum 400 observed in a fusion zone of a non-defective electrofusion coupling joint. US pulse echoes having larger amplitudes represent changes in materials as the US pulse travels through the electrofusion coupling joint. A group of preliminary US pulse echoes 404 results from an imperfect interface between the US probe and the electrofusion coupling joint. A first set of observed US pulse echoes 408 having larger amplitudes represent reflections from the heating wires and the fusion interface between the electrofusion fitting and the pipes and occurs within a first US spectrum range 412. A second set of observed US pulse echoes 416 having larger amplitudes represent reflections from the interior surface of the pipe occurs within a second US spectrum range 420. This may also be referred to as a "back wall" spectrum; the highest peak may be referred to as a "back wall peak"

Figure 9A:
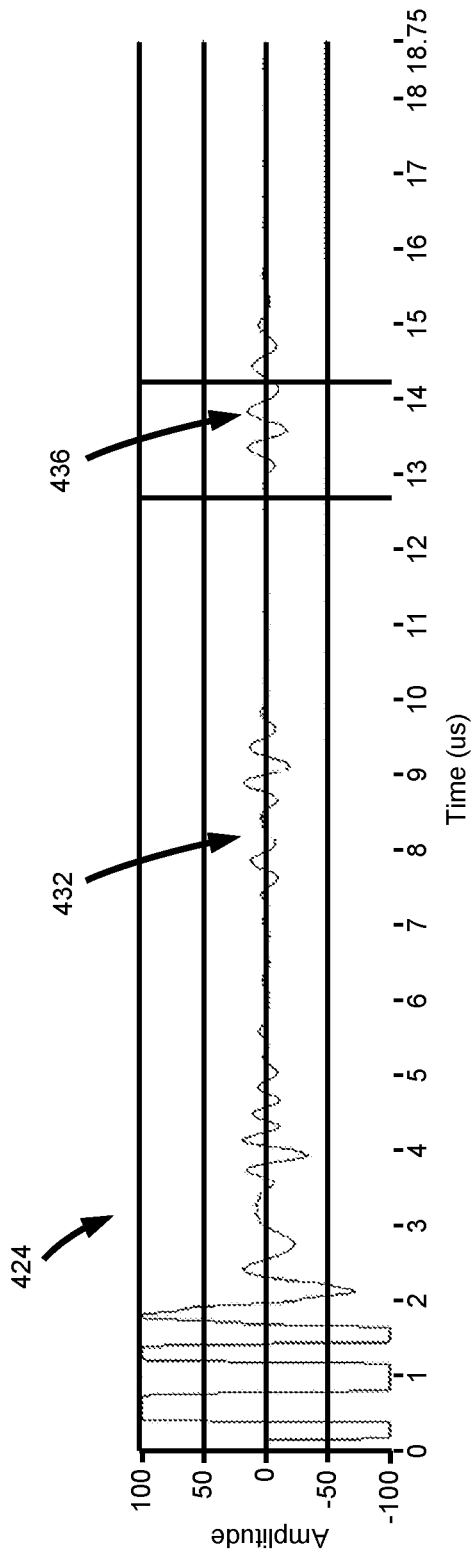
FIG. 9A shows an US pulse-echo spectrum observed in an electrofusion coupling joint using the apparatus of FIG. 2A.
Figure 9B:
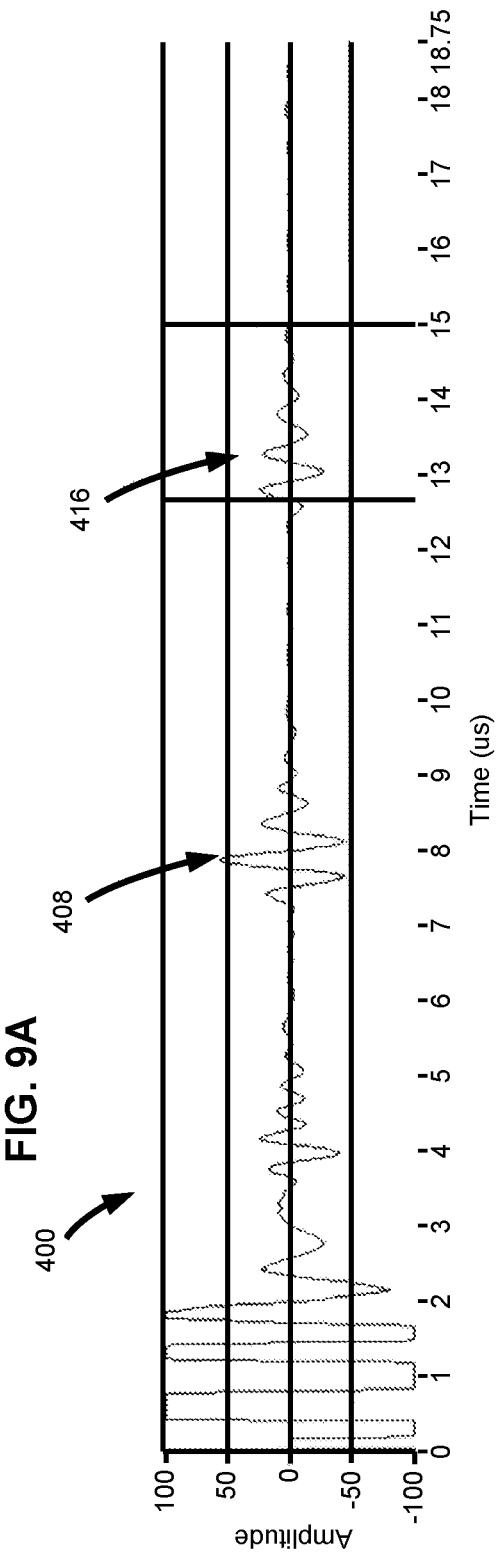
FIG. 9B shows an US pulse-echo spectrum observed in a non-defective electrofusion coupling joint, compared to FIG. 9A.

FIG. 9 shows a typical US pulse-echo spectrum 424 observed in an electrofusion coupling joint where fusion was interrupted compared to the typical US pulse-echo spectrum 400 observed in a non-defective electrofusion coupling joint. In the interrupted US pulse-echo spectrum 424, a first set of observed US pulse echoes 432 corresponding to the interface between the electrofusion fitting and the pipe has much smaller amplitudes and is prolonged. A second set of observed US pulse echoes 436 representing reflections from the interior surface of the pipe again has smaller amplitudes and are prolonged.

Figure 10A:
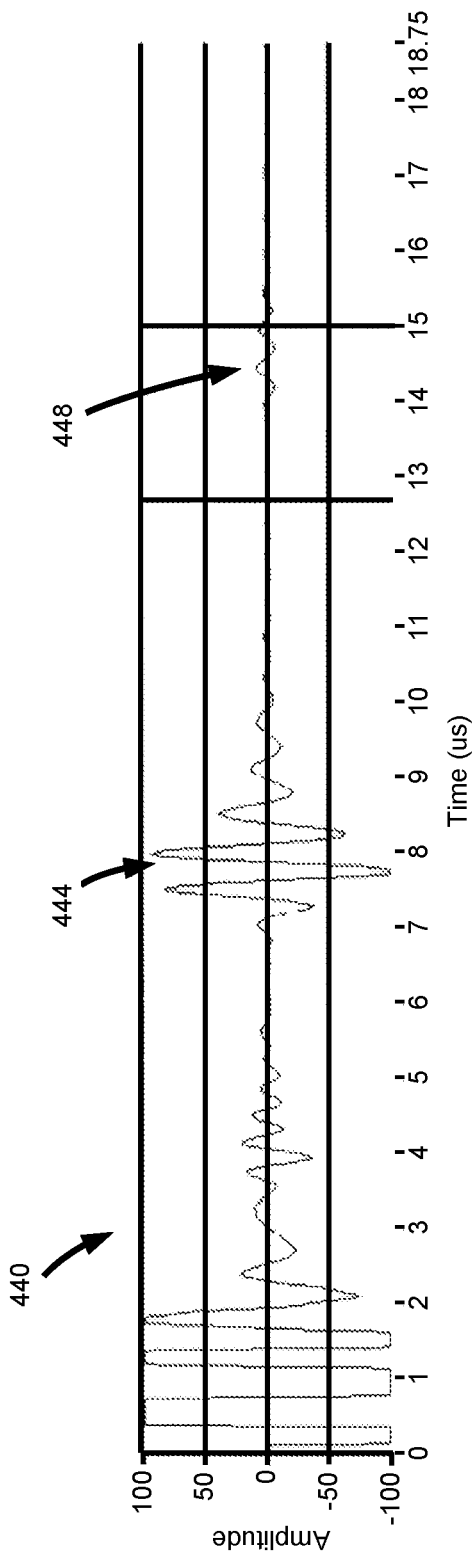
FIG. 10A shows an US pulse-echo spectrum observed in an electrofusion coupling joint having a water pocket/void in the joint using the apparatus of FIG. 2A.
Figure 10B:
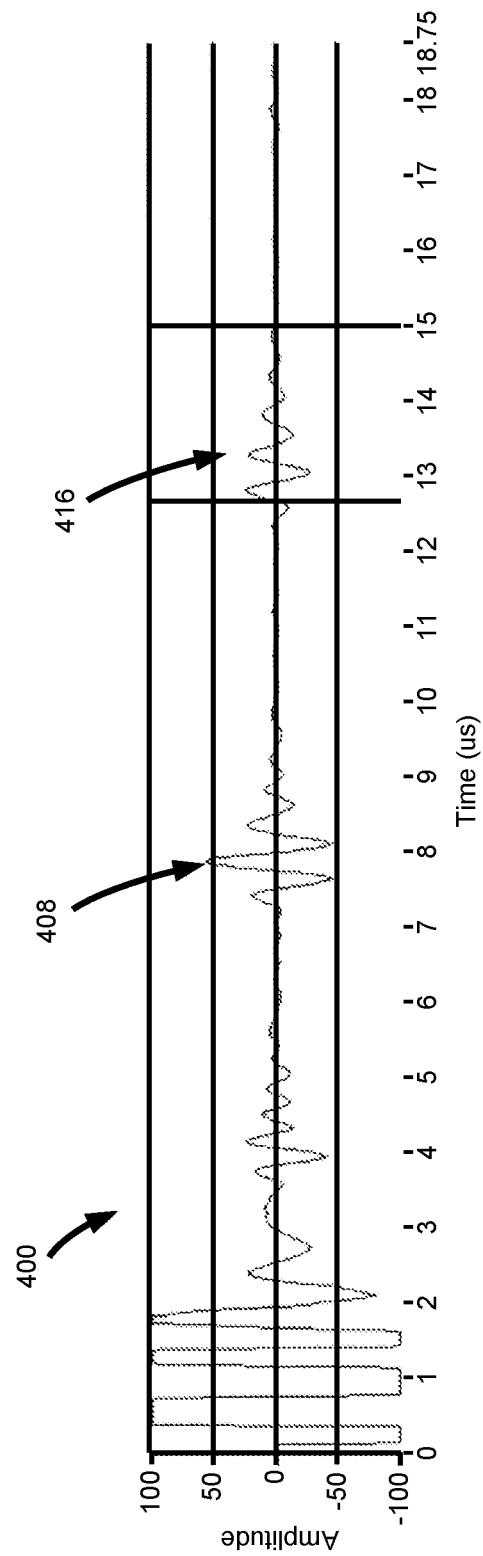
FIG. 10B shows an US pulse-echo spectrum observed in a non-defective electrofusion coupling joint, compared to FIG. 10A.

FIG. 10 shows a typical US pulse-echo spectrum 440 observed in an electrofusion coupling joint having a water pocket/void in the joint compared to the typical US pulse-echo spectrum 400 observed in a non-defective electrofusion coupling joint. In the US pulse-echo spectrum 440 observed in the electrofusion coupling joint having a water pocket/void in the joint, a first set of observed US pulse echoes 444 corresponding to the interface between the electrofusion fitting and the pipe has much larger amplitudes. A second set of observed US pulse echoes 448 representing reflections from the interior surface of the pipe again has much smaller amplitudes and are prolonged.

FIG. 11 shows a typical US pulse-echo spectrum 452 observed in an electrofusion coupling joint having mud or other contamination in the joint compared to the typical US pulse-echo spectrum 400 observed in a non-defective electrofusion coupling joint. In the US pulse-echo spectrum 452 observed in the electrofusion coupling joint having mud or other contamination in the joint, a first set of observed US pulse echoes 456 corresponding to the interface between the electrofusion fitting and the pipe has smaller amplitudes. A second set of observed US pulse echoes 460 representing reflections from the interior surface of the pipe again has smaller amplitudes.

Figure 12A:
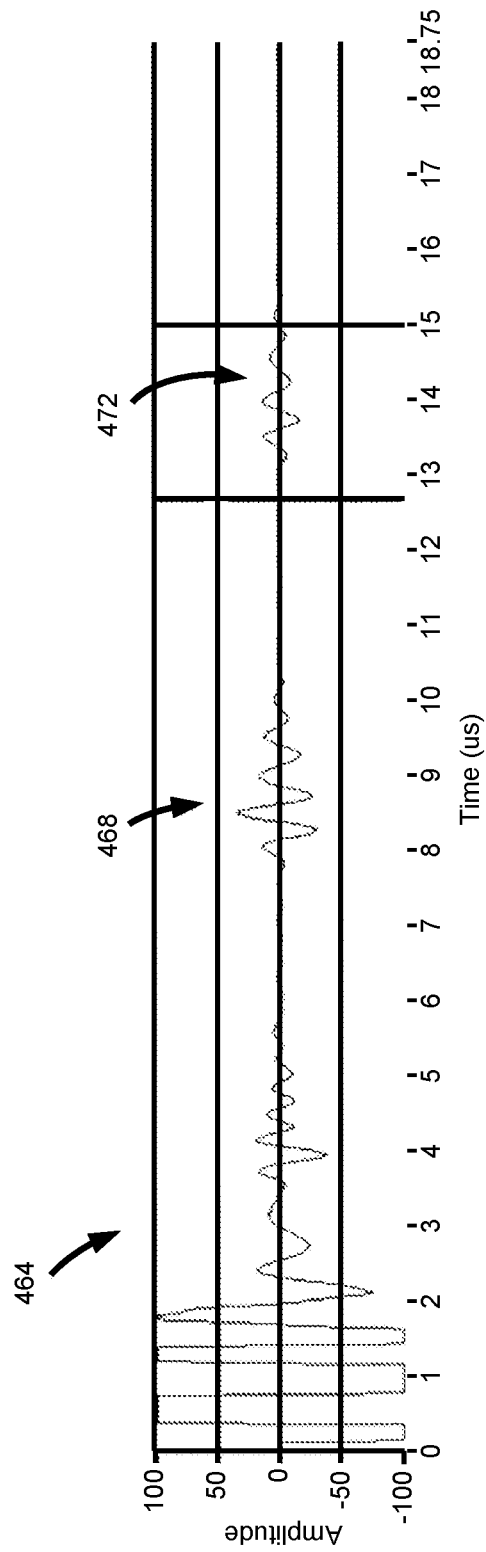
FIG. 12A shows an US pulse-echo spectrum observed in an electrofusion coupling joint wherein the electrofusion fitting is misaligned with the polymer pipe using the apparatus of FIG. 2A.
Figure 12B:
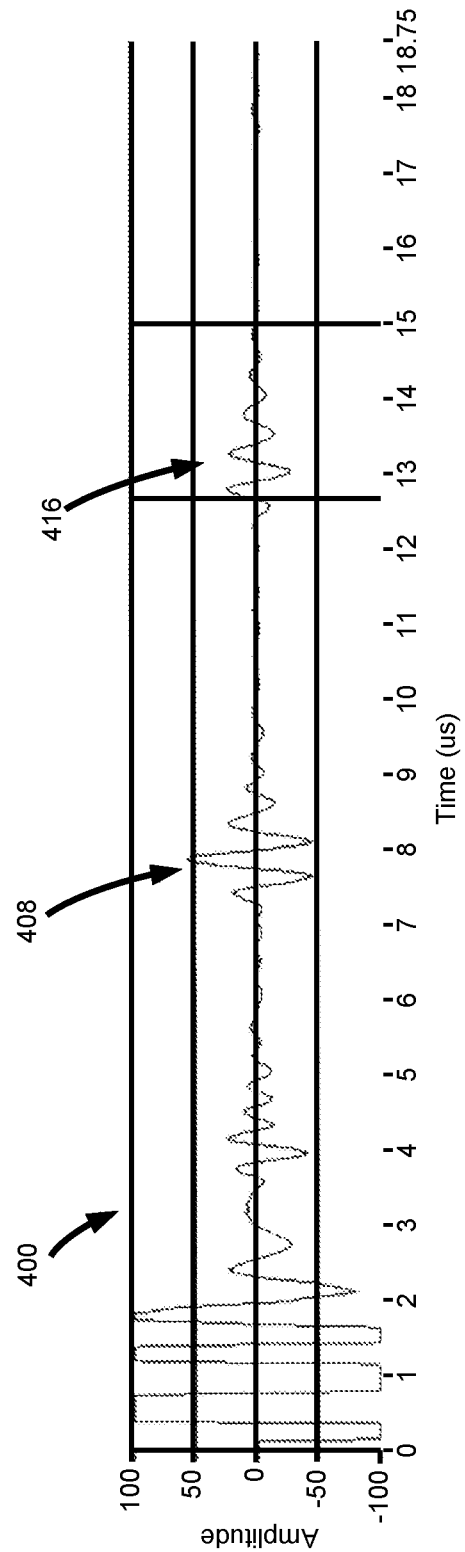
FIG. 12B shows an US pulse-echo spectrum observed in a non-defective electrofusion coupling joint, compared to FIG. 12A.

FIG. 12 shows a typical US pulse-echo spectrum 464 observed in an electrofusion coupling joint wherein the electrofusion fitting is misaligned with the polymer pipe compared to the typical US pulse-echo spectrum 400 observed in a non-defective electrofusion coupling joint. In the US pulse-echo spectrum 464 observed in the electrofusion coupling joint wherein the electrofusion fitting is misaligned with the polymer pipe, a first set of observed US pulse echoes 468 corresponding to the interface between the electrofusion fitting and the pipe has smaller amplitudes. A second set of observed US pulse echoes 472 representing reflections from the interior surface of the pipe again has smaller amplitudes.

Figure 13A:
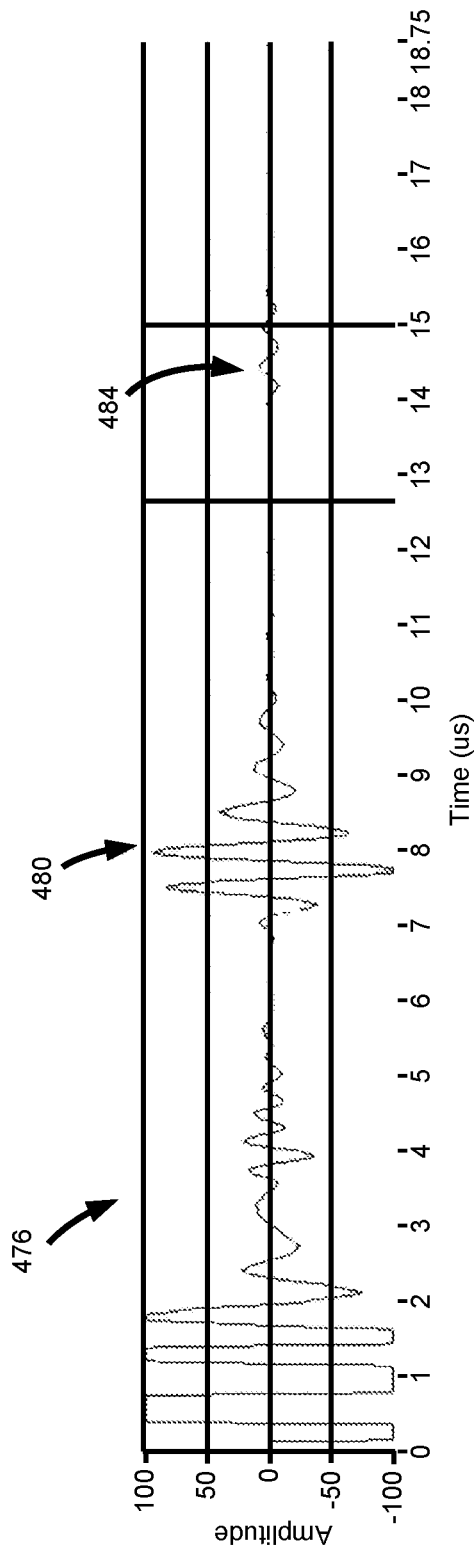
FIG. 13A shows an US pulse-echo spectrum observed in an electrofusion coupling joint where the polymer pipe is under-inserted into the electrofusion fitting prior to electrofusion using the apparatus of FIG. 2A.
Figure 13B:
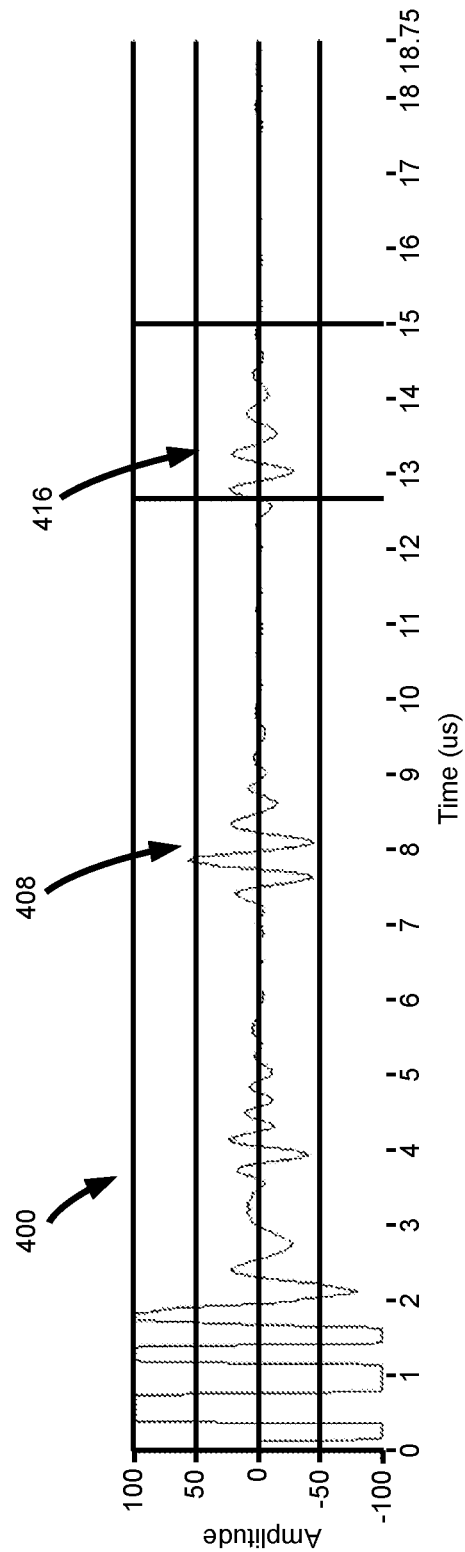
FIG. 13B shows an US pulse-echo spectrum observed in a non-defective electrofusion coupling joint, compared to FIG. 13A.

FIG. 13 shows a typical US pulse-echo spectrum 476 observed in an electrofusion coupling joint where the polymer pipe is under-inserted into the electrofusion fitting prior to electrofusion compared to the typical US pulse-echo spectrum 400 observed in a non-defective electrofusion coupling joint. In the US pulse-echo spectrum 476 observed in the electrofusion coupling joint where the polymer pipe is under-inserted into the electrofusion fitting prior to electrofusion, a first set of observed US pulse echoes 480 corresponding to the interface between the electrofusion fitting and the pipe has much larger amplitudes. A second set of observed US pulse echoes 484 representing reflections from the interior surface of the pipe again has much smaller amplitudes that are delayed.

Figure 14A:
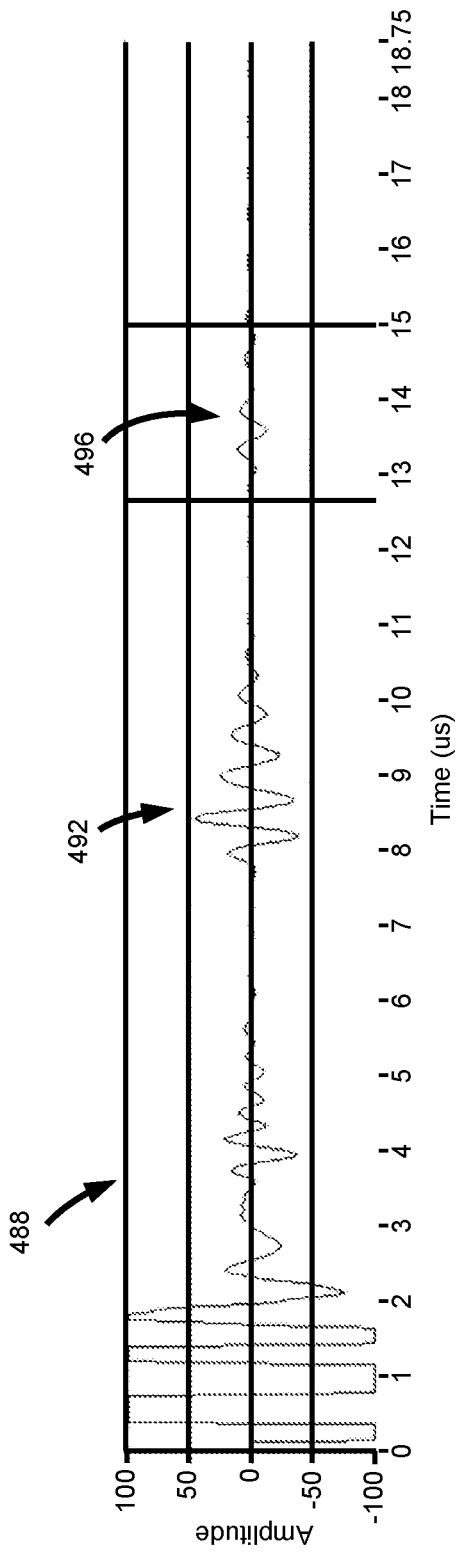
FIG. 14A shows an US pulse-echo spectrum observed in an electrofusion coupling joint where the surface of the polymer pipe is over-scraped prior to electrofusion using the apparatus of FIG. 2A.
Figure 14B:
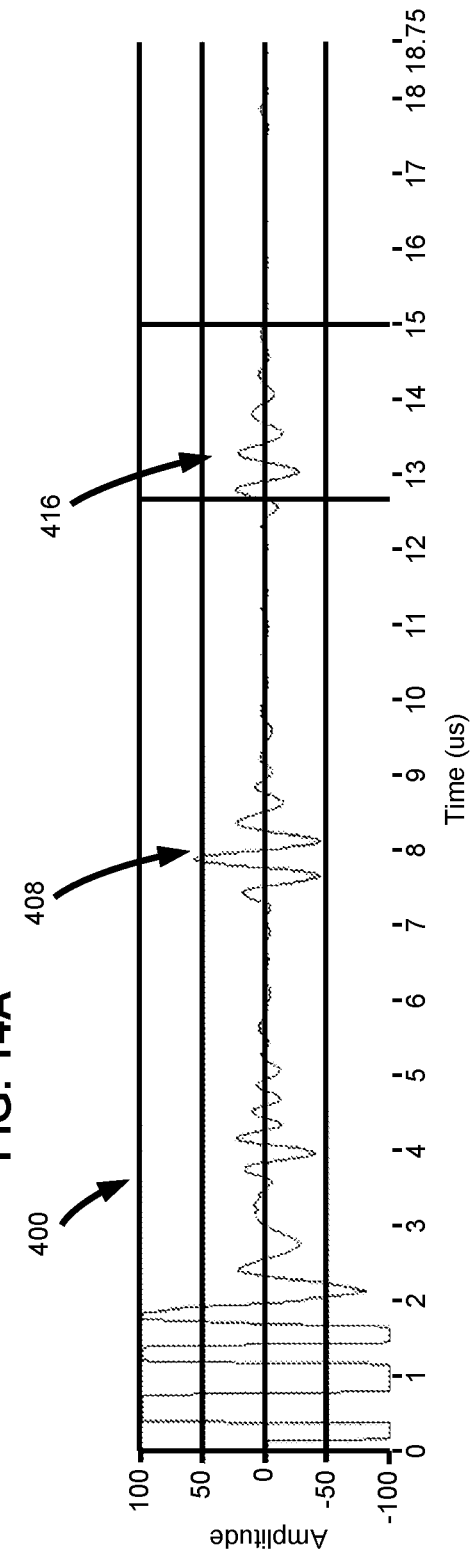
FIG. 14B shows an US pulse-echo spectrum observed in a non-defective electrofusion coupling joint, compared to FIG. 14A.

FIG. 14 shows a typical US pulse-echo spectrum 488 observed in an electrofusion coupling joint where the polymer pipe is over-scraped prior to insertion into the electrofusion fitting compared to the typical US pulse-echo spectrum 400 observed in a non-defective electrofusion coupling joint. In order to encourage a stronger joint, the exterior pipe surface 28 is scraped. Where the exterior pipe surface is over-scraped, a good joint between the electrofusion fitting and the irregular over-scraped exterior pipe surface can be difficult. In the US pulse-echo spectrum 488 observed in the electrofusion coupling joint where the polymer pipe is over-scraped prior to insertion into the electrofusion fitting, a first set of observed US pulse echoes 492 corresponding to the interface between the electrofusion fitting and the pipe is delayed. A second set of observed US pulse echoes 496 representing reflections from the interior surface of the pipe again has much smaller amplitudes that are delayed.

FIG. 15 shows a typical US pulse-echo spectrum 500 observed in an electrofusion coupling joint where the polymer pipe is not been scraped prior to insertion into the electrofusion fitting and is oxidized compared to the typical US pulse-echo spectrum 400 observed in a non-defective electrofusion coupling joint. Where the exterior pipe surface is not scraped prior to insertion into the electrofusion fitting and is oxidized, a good joint between the electrofusion fitting and the pipe can be difficult, as the oxidized exterior pipe surface can be more difficult to fuse. In the US pulse-echo spectrum 500 observed in the electrofusion coupling joint where the polymer pipe is not scraped prior to insertion into the electrofusion fitting and is oxidized, a first set of observed US pulse echoes 504 corresponding to the interface between the electrofusion fitting and the pipe has smaller amplitudes. A second set of observed US pulse echoes 508 representing reflections from the interior surface of the pipe again has smaller amplitudes.

FIG. 16 shows a typical US pulse-echo spectrum 512 observed in an electrofusion coupling joint with a void compared to the typical US pulse-echo spectrum 400 observed in a non-defective electrofusion coupling joint. In the typical US pulse-echo spectrum 512 observed in the electrofusion coupling joint with a void, a first set of observed US pulse echoes 516 corresponding to the interface between the electrofusion fitting and the pipe has much larger amplitudes. A second set of observed US pulse echoes 520 representing reflections from the interior surface of the pipe again has smaller amplitudes that are delayed.

If the received US pulse-echo spectrum matches sufficiently the expected US pulse-echo spectrum, the received US pulse-echo spectrum is deemed good and marked in the joint map 312 with green. If, instead, the received US pulse-echo spectrum received matches sufficiently a typical US pulse-echo spectrum for a defective joint or simply doesn't match the expected US pulse-echo spectrum, the received US pulse-echo spectrum is deemed bad and marked in the joint map 312 with red. If the received US pulse-echo spectrum received matches insufficiently a typical US pulse-echo spectrum for a defective joint or simply doesn't match the expected US pulse-echo spectrum, the received US pulse-echo spectrum is deemed undetermined and marked in the joint map 312 with yellow.

Various approaches for determining a degree of matching between the received US pulse-echo spectrum and the expected US pulse-echo spectrum can be employed.

One or more rules from the rules database may be used to perform the classification. Examples of rules for an electrofusion coupling joint include:

- If the fusion joint is an electrofusion coupling joint, and if a US scanning position is in a cold zone, and the US pulse-echo spectrum has two peaks above a threshold, then the US scanning position is deemed good; that is, marked green
- If the fusion joint is an electrofusion coupling joint, and if a main peak>a main peak threshold and a back-wall peak<a back wall threshold, then the US scanning position is marked as bad and as a small void,
- If the fusion joint is an electrofusion coupling joint, and if the maximum amplitude is between the expected ranges for the expected echoes from the electrofusion fitting/pipe interface and the back wall, then the US scanning position is bad, and marked as red Returning again to FIG. 3, upon analyzing and classifying (240) the received US pulse-echo spectrum for the particular US scanning position, the apparatus checks to see if the location that has just been scanned, is anomalous or good (245). If the classification result is anomalous, additional scanning locations (near the location classified as anomalous) are scanned and classified (250).

The apparatus then analyzes the collective results (or classifications) of the scanned locations at this juncture, by applying a series of subtests (255). Upon applying the series of subtests, it is determined whether the fusion joint is rejected (260).

The rejection of an electrofusion coupling joint can be determined using a series of six sub-tests based on the green, yellow, red and void ratings determined for each US scanning position. Each of the six sub-tests is a comparison of a sub-combination of the green, yellow, red, and void ratings and a respective failure threshold. For each sub-test, if the sub-combination of the ratings is above the respective failure threshold, a flag will be set. If there are any flags, the overall test will be a fail. That is, a fusion joint is rejected if it fails any one of the six sub-tests. If, instead, all six sub-tests are passed, the electrofusion fusion joint is not rejected thus far.

The valuation of each scanned cell described above, can be used for subtests of the electrofusion coupling joint.

In a first sub-test, it can be determined whether the fusion zones are sufficiently fused:

$$\text{Fusion Zone Percentage of Failure (FusionZone \%)} \geq \text{FZ \% Thresh} \quad (1)$$

In a second sub-test, it can be determined whether a single void extends longitudinally across the fusion joint:

$$\text{Max Single Void across one row (SingleVoidSize)} \geq \text{SingleVoidThresh} \quad (2)$$

In a third sub-test, it can be determined if a number of voids extend longitudinally across the fusion joint:

$$\text{Max Sum of Multiple Voids across row (MultipleVoidSum)} \geq \text{MultipleVoidThres} \quad (3)$$

In a fourth sub-test, it can be determined if there are a percent of yellow or red locations that extend longitudinally across a row of the fusion joint:

$$\text{Max Percentage of Failure across one row (MaxRow \%)} \geq \text{RowThresh} \quad (4)$$

In a fifth sub-test, it can be determined if there are a percent of yellow or red locations that exist in any of the quadrants of the fusion joint (there are eight quadrants in an electrofusion coupling joint):

$$\text{Max Percentage of Failure for the Quadrants (Max Quad \%)} \geq \text{QuadrantThresh} \quad (5)$$

Finally, in a sixth sub-test, it can be determined if a percent of the cold zone has yellow or red locations:

$$\text{Cold Zone Percentage of Failure (CZ \%)} \geq \text{CZ \% Thresh} \quad (6)$$

If any of these sub-tests are true, then the respective flag is set, and the fusion joint will be deemed a failure; that is, defective.

While, in the present embodiment, these sub-tests are calculated each time data is collected via the US probe, it can be desirable in other scenarios to reduce the frequency of these tests, such as reducing the frequency of times the subtests are applied; applying the sub-tests after scanning every row of US scanning positions, etc. Further, it can be advantageous to only perform a sub-set of the tests or perform a sub-set of the tests more frequently than other sub-sets of the tests.

Figure 17:
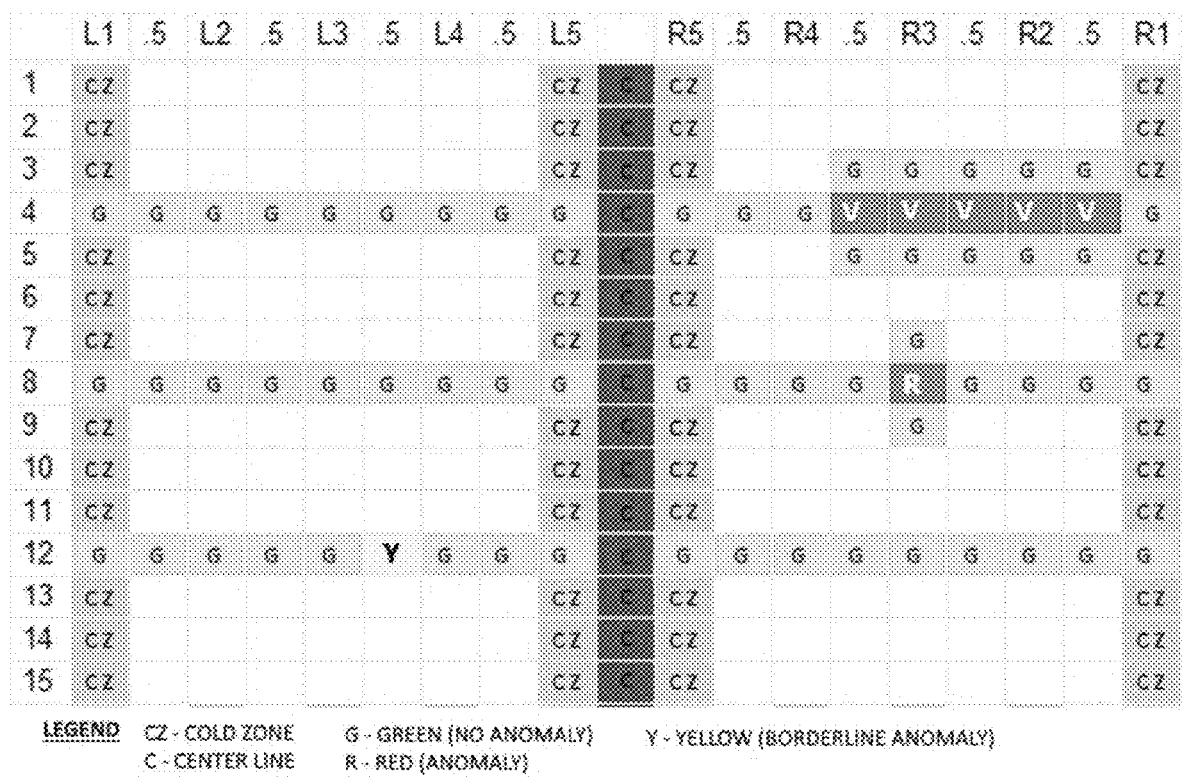
FIG. 17 is a schematic mapping of initial US scanning positions along the grid of FIG. 5A using the apparatus of FIG. 2A.

FIG. 17 shows an exemplary joint map 525 of scanned US scanning positions during inspecting of an electrofusion coupling joint. The initial set of US scanning positions are along grid lines G4, G8 and G12. Each US scanned result is discussed as follows.

Along G4, all US scanning positions from L1 to L5 have been deemed 'good' (labeled as 'G' for "green"), including US scanning positions in the cold zone G4/L1 and G4/L5. However, continuing from R5 to R1, it is seen that following three consecutive good readings (from R5 to R4), five successive 'red' (or "bad") readings are found at US scanning position R3.5 to R1.5. In addition, the four successive 'red' readings from R3.5 to R2 have each been identified as a void. In addition, US scanning positions in the cold zone G4/R5 and G4/R1 are deemed to be good.

Along G8, all US scanning positions from L1 to L5 have been deemed 'good' (labeled as CG' for "green"), including US scanning positions in the cold zone G8/L1 and G8/L5. However, continuing from R5 to R1, it is seen that four consecutive "green" markings from R5 to R3.5 is followed by a 'red' reading at R3, followed by four consecutive "green" markings from R2.5 to R1. In addition, US scanning positions in the cold zone G8/R5 and G8/R1 are deemed to be good.

Along G12, all US scanning positions from L1 to L5 have been deemed 'good' (labeled as CG' for "green"), except for US scanning position L3.5, which is deemed as undetermined (labeled as 'Y' for yellow). In addition, US scanning positions in the cold zone G12/L1 and G12/L5 are deemed to be good. However, continuing from R5 to R1, it is seen that all US scanning positions have been deemed good. In addition, US scanning positions in the cold zone G12/R5 and G12/R1 are deemed to be good.

Once these initial US scanning positions have been classified (as 'green', 'red' or 'void'), process rules are applied to the collective readings to decide if the joint is rejected. In this example, the joint is rejected due to the maximum amount of failure in one row being greater than the allowable threshold. In accordance with FIG. 3C, additional US scanning locations are added proximate to each US scanning position classified as 'red'. These are further discussed as follows.

For initial US scanning positions classified as 'red' along gridline G4, additional positions are scanned proximate to each cell classified as 'red'. These additional scanning positions are along G3, from R3.5 to R1.5; and G5, from R3.5 to R1.5. Following US scanning, it is seen from FIG. 17 that each of these additional scanning positions is deemed good. These additional US scanned positions indicate that the void extends only along G4 from R3.5 to R2. The particular defect at G4/R1.5 is not identified.

For US scanning positions classified as 'red' along gridline G8, additional positions are scanned proximate to the position at G8/R3 classified as 'red'. These additional scanning positions are at G7/R and G9/R3. Following US scanning, it is seen from FIG. 17, that each of these additional scanning positions is deemed good. Therefore, the defect is localized at G8/R3.

Since there are no US scanned positions marked 'red' along G12, there are no additional positions to scan.

As can be seen, the US scanning positions proximate US scanning positions classified as red, are also selected for scanning to determine the size of the bad portions of the electrofusion coupling joint.

Socket Heat Fusion

While the apparatus and approach described above has been narrated with reference to electrofusion joints, it can be used with various other types of fusion joints. One such type of fusion joint is one formed via socket heat fusion, also referred to as socket fusion. Socket fusion joining involves the heating of an exterior surface at an end of a pipe and an interior surface of a socket joint fitting prior to pressing these surfaces together.

Figure 18A:
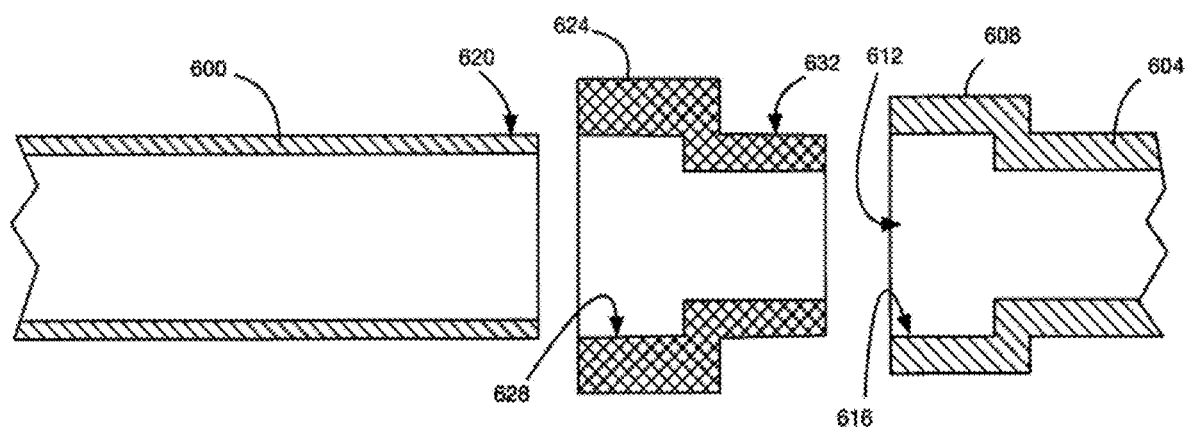
FIG. 18A shows a section view of a socket fusion tool interposed between a fitting and a pipe.

FIG. 18A shows a pipe 600 and a socket joint fitting 604 oriented for forming a socket joint. The socket joint fitting 604 has a circumferential collar 608 that surrounds an opening 612 for receiving the pipe 600. An internal annular surface 616 of the collar 608 is sized to receive an exterior surface 620 at an end of the pipe 600. In order to fuse the exterior surface 620 of the pipe 600 with the internal annular surface 616 of the socket joint fitting 604, a socket joint tool 624 is used to heat up the internal annular surface 616 of the collar 608 and the exterior surface 620 of the pipe 600. The socket joint tool 624 has an interior annular heating surface 628 corresponding to the exterior surface 620 of the pipe 600, and an exterior cylindrical heating surface 632 corresponding to the internal annular surface 616 of the socket joint fitting 608.

Prior to use of the socket joint tool 624, the internal annular surface 616 and the exterior surface 620 are lightly abraded to ensure that dirt and hardening along the surface of the pipe 600 and the socket joint fitting 604 are removed.

Figure 18B:
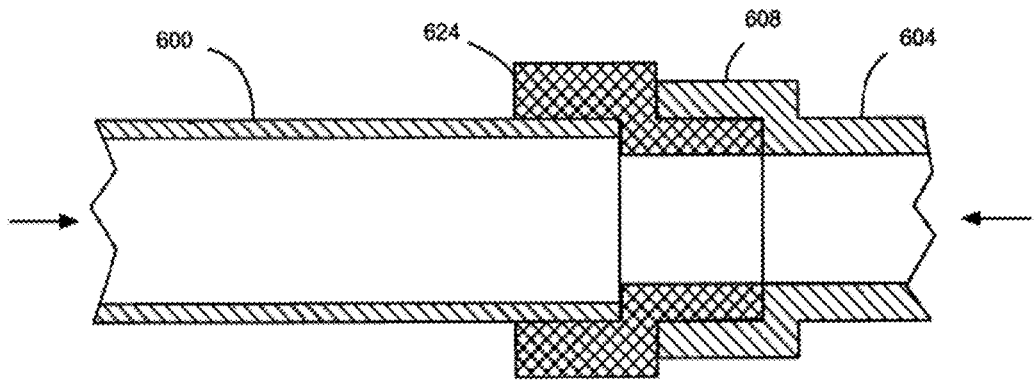
FIG. 18B shows a section view of the socket fusion tool interposed between and in contact with the fitting and the pipe of FIG. 18A.

FIG. 18B shows the pipe 600 and the socket joint fitting 604 being pressed against the socket joint tool 624. Via contact under pressure with the interior annular heating surface 628 and the exterior cylindrical heating surface 632 when heated, the exterior surface 620 of the pipe 600 and the internal annular surface 616 of the socket joint fitting 604 are heated, melting some of the material of the socket joint fitting 604 and the pipe 600.

Figure 18C:
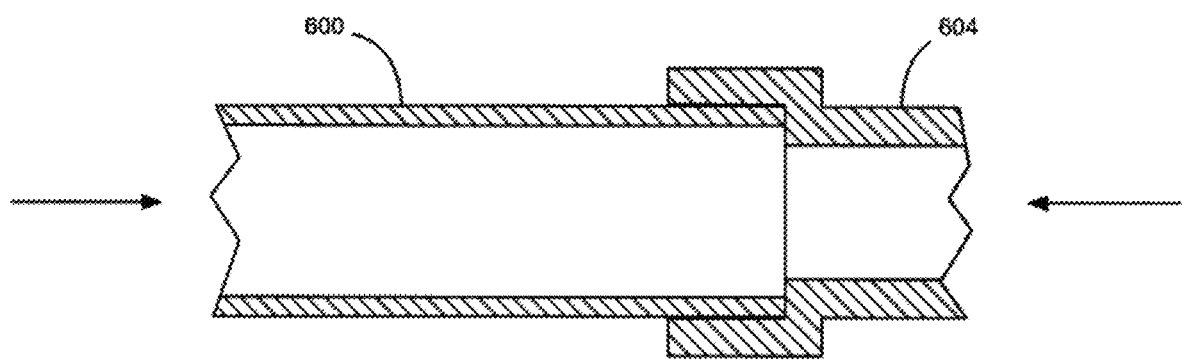
FIG. 18C shows a section view of the fitting and the pipe being pressed together after heating via the socket fusion tool of FIG. 18A.

After an appropriate period of time, the socket joint fitting 604 and the pipe 600 are separated, the socket joint tool 624 is removed, and the heated exterior surface 620 of the pipe 600 and the heated internal annular surface 616 of the socket joint fitting 604 are pressed into contact with one another under pressure immediately for a period of time while the melted material bonds and cools, as shown in FIG. 18C.

Various issues can occur during the creation of a saddle fusion joint. For example, the pipe 600 and the socket joint fitting 604 can be dirty or scratched. The pipe 600 and the socket joint fitting 604 can be moved relative to one another prior to their cooling. The heating temperature of the socket joint tool 624 may be too high or too low. The heated internal annular surface 616 of the socket joint fitting 624 and the exterior surface 620 of the pipe 600 may be allowed to unduly cool prior to joining. The appropriate joining force applied to the pipe 600 and the socket joint fitting 624 may not be maintained for the prescribed period. Any of these issues can result in imperfections in the socket joint.

Figure 18D:
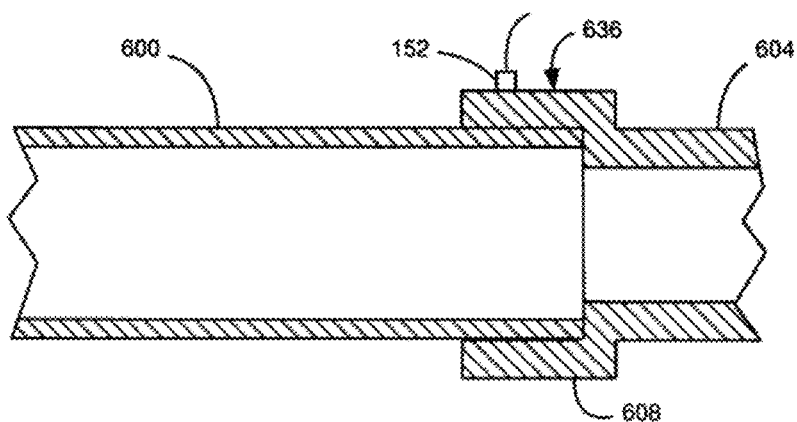
FIG. 18D shows a section view of the joint formed between the fitting and the pipe of FIG. 18A being inspected using the apparatus for inspecting fusion joints of FIGS. 2A and 2B.

The integrity of the socket joint formed by the socket joint fitting 604 and the pipe 600 can then be inspected using the apparatus 100 via positioning of the US probe 152 against an outer surface 636 of the collar 608 as shown in FIG. 18D. The apparatus 100 can be conditioned to a socket joint inspecting condition and direct a user to move the US probe 152 accordingly. The socket joint has a single circumferential fusion zone to inspect in comparison to the two circumferential fusion zones in the electrofusion joint described above. Thus, the tests are similar to that for a single side of the electrofusion joint described above.

As will be appreciated, socket joints have no cold zones and do not have heating wires that cause certain types of echoes in the US readings.

Saddle Heat Fusion

Another type of fusion joint testable using the apparatus 100 is a saddle heat fusion joint, also known as a saddle fusion joint. Saddle fusion joining involves the heating of an exterior surface of a pipe and an abutment surface of a tee joint fitting prior to pressing these surfaces together.

Figure 19A:
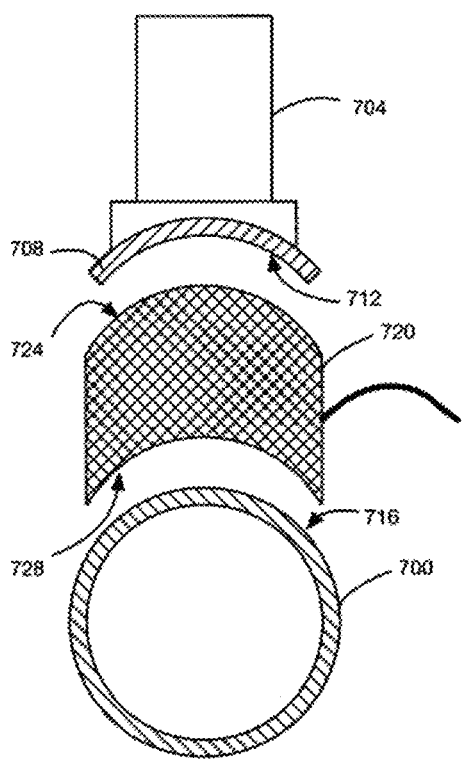
FIG. 19A shows a section view of a saddle fusion tool interposed between a fitting and a pipe.

FIG. 19A shows a pipe 700 and a tee joint fitting 704 oriented for forming a tee joint. The tee joint fitting 704 has an arcuate flange 708 that surrounds an opening (not shown). The arcuate flange 708 has an arcuate surface 712 that is dimensioned to correspond to the shape of an exterior surface 716 of the pipe 700. In order to fuse the arcuate flange 708 to the exterior surface 716 of the pipe 700, a saddle joint tool 720 is used to heat up the arcuate surface 712 of the arcuate flange 708 and the exterior surface 716 of the pipe 700. The saddle joint tool 720 has a circumferentially serrated convex heating surface 724 corresponding to the arcuate surface 712 of the arcuate flange 708, and a circumferentially serrated concave heating surface 728 corresponding to the exterior surface 716 of the pipe 700.

Prior to use of the saddle joint tool 720, the arcuate surface 712 and the exterior surface 716 are lightly abraded to ensure that dirt and hardening along the surface of the pipe 700 and the tee joint fitting 704 are removed.

Figure 19B:
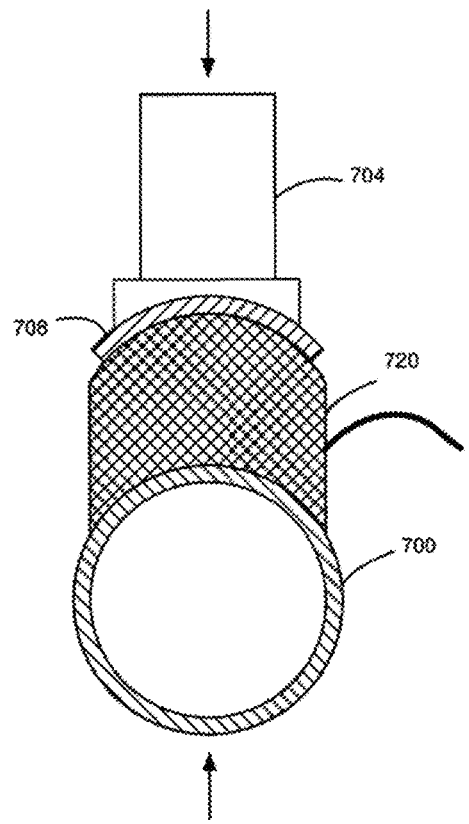
FIG. 19B shows a section view of the saddle fusion tool interposed between and in contact with the fitting and the pipe of FIG. 19A.

FIG. 19B shows the pipe 700 and the tee joint fitting 704 being pressed against the saddle joint tool 720. Via contact under pressure with the convex heating surface 724 and the concave heating surface 728 when heated, the arcuate surface 712 and the exterior surface 716 are heated, melting some of the material of the tee joint fitting 704 and the pipe 700, and forming serrations.

Figure 19C:
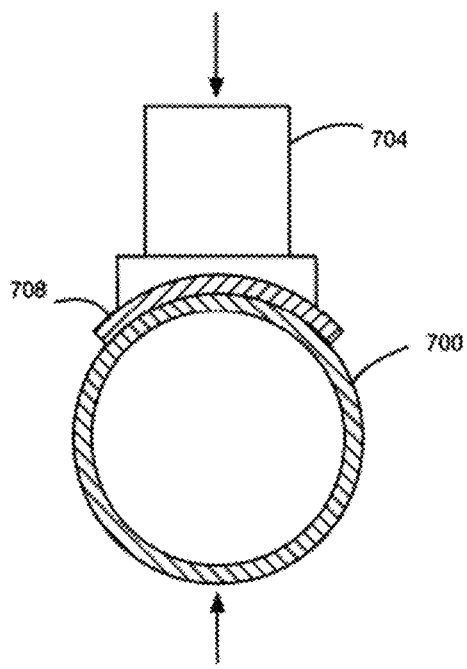
FIG. 19C shows a section view of the fitting and the pipe being pressed together after heating via the saddle fusion tool of FIG. 19A.

After an appropriate period of time, the tee joint fitting 704 and the pipe 700 are separated, the saddle joint tool 720 is removed, and the heated arcuate surface 712 of the tee joint fitting 704 and the heated exterior surface 716 of the pipe 700 are pressed into contact with one another under pressure immediately for a period of time while the melted material bonds and cools, as shown in FIG. 19C.

Various issues can occur during the creation of a saddle fusion joint. For example, the pipe and the tee joint fitting can be dirty or scratched. The pipe 700 and the tee joint fitting 704 can be moved relative to one another prior to their cooling. The heating temperature of the saddle joint tool 720 may be too high or too low. The heated arcuate surface 712 of the tee joint fitting and the exterior surface 716 of the pipe 700 may be allowed to unduly cool prior to joining. The appropriate joining force applied to the pipe 700 and the tee joint fitting 704 may not be maintained for the prescribed period. Any of these issues can result in imperfections in the tee joint.

Figure 19D:
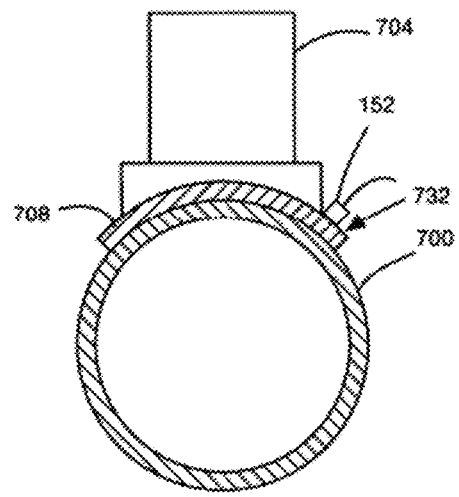
FIG. 19D shows a section view of the joint formed between the fitting and the pipe of FIG. 19A being inspected using the apparatus for inspecting fusion joints of FIGS. 2A and 2B.

The integrity of the tee joint formed by the tee joint fitting 704 and the pipe 700 can then be inspected using the apparatus 100 via positioning of the US probe 152 against an outer surface 732 of the arcuate flange 708 as shown in FIG. 19D. The apparatus 100 can be conditioned to a tee joint inspecting condition and direct a user to move the US probe 152 accordingly.

Difference Between Couplings and Tee Joints

The fusion zone for a tee joint occurs around a perimeter of the arcuate surface 712 of the arcuate flange 708 of the tee joint fitting 704. In many cases, the integrity of the tee joint is only inspected along the outer surface 732 of the arcuate flange 708.

For couplings, void sizes are calculated across a row, for example if a void spanned across Row 2—L2, 2.5, L3, these would all be summed together to make one void size.

For tee joints, a void size would be calculated across columns, only if the columns are on the same side of the tee joint. For example, if a tee has 4 rows, rows 1 and 2 will be on the back of the tee joint and rows 3 and 4 will be on the front side of the tee joint. There typically is an equal number of rows on the front and back of a tee joint. Therefore, a void would be sized if the void was found in row 1, L2 and row 2, L2.

If only one void is found in a row, it will be sized, divided by the fusion zone width (w), a value that is calculated and stored for each row. If more than one void is found in a row (i.e., there are multiple cells that are not adjacent to each other), all void sizes will be summed, divided by the fusion zone width (w).

Here is an example of how to size a void:

```
Int y = 0 // Void Counter
For (int i=0; i < 5; i++) // Cycle through one row (Fusion Zone Only)- L2, L2.5, L3,
L3.5, L4
{
  IF(Cell(i)==LVoid || Cell(i)==SVoid)) // If the cell is a void - small or large
  {
    IF (Cell(i-1) != LVoid && Cell(i-1) != SVoid) // If the previous cell isn't a
    void
    {
      SWITCH(Cell(i-1)
        Case SVoid: VoidSize(y)= 0.5 * BeamWidth
        Case LVoid: VoidSize(y)= 0.75 * BeamWidth
    }
    ELSEIF (Cell(i-1) == Cell(i)) // If the previous cell is the same void
    type as the current cell
    {
      VoidSize(y)=VoidSize(y) + diameter/4
    }
    ELSEIF(Cell(i) ==SVoid && Cell(i-1)==LVoid)
    {
      VoidSize(y)=VoidSize(y) + diameter/4 + b/8
    }
    ELSEIF(Cell(i) ==LVoid && Cell(i-1)==SVoid)
    {
```

```
    VoidSize(y)=VoidSize(y) + diameter/4 − b/8
    }
  ELSEIF (Cell(i−1) ==LVoid || Cell(i)==SVoid)) // Found the end of a void
    {
    y++ // next void
    }
  }
}
```

The maximum single void found is then divided by the fusion zone width. The maximum sum of multiple voids is then divided by the fusion zone width.

Row Percentage (Leak Path) Analysis

This percentage will use the same CellValue calculation as above.

The calculation is the sum of all CellValue(row,column) in the fusion zone for a row (ex. L2, L2.5, L3, L3.5, L4 of L1, L1.5, L2, L2.5, L3, L3.5, L4, L4.5, L5) divided by the count of cells in the fusion zone in that row (5 in the example given).

A percentage should be calculated for each row on the left side, and each row on the right side. The maximum of all row percentages will be stored in MaxRow % and compared against the RowThresh.

If MaxRow %>RowThresh {JointQuality=1}

Quadrant Quality Percent Analysis

Each side of the fusion zone is divided into 4 equally sized sections (#Rows/4), for a total of eight quadrants for couplings. For tee joints, four quadrants are used, two on the left side and two on the right side.

Cold Zone Quality Percent Analysis

This calculation does not apply to tee joints.

Butt Heat Fusion Butt heat fusion joints also referred to as butt fusion joints, can also be inspected with the apparatus 100. In butt heat fusion joining, two adjacent ends of pipes are heated, then pressed together such that the ends fuse. Whereas in electrofusion joints the fusion zone is parallel to the pipes, in butt-fusion joints, the fusion zone is perpendicular to the pipes. This requires a different way to collect data regarding the butt-fusion joint, using a different technique. In an embodiment, the US signals are directed at angles oblique to the surface of the pipes being joined. While the manner in which the data is collected differs from that of other fusion joints, the way the data is used to assess the integrity of a butt-fusion joint is similar to data analysis of other types of fusion joints.

Figure 20A:
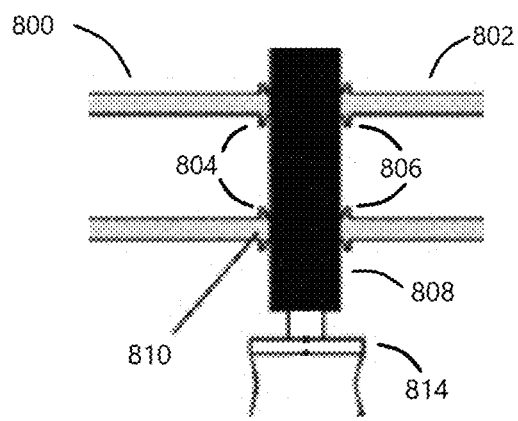
FIG. 20A shows a section view of a butt fusion tool interposed between and in contact with two pipes.
Figure 20B:
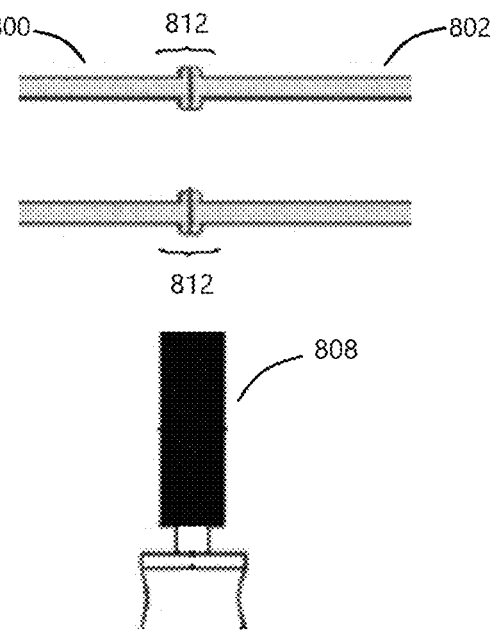
FIG. 20B shows a section view of the two pipes being pressed together after heating via the butt fusion tool of FIG. 20A.

FIGS. 20A and 20B illustrate a butt-fusion procedure comprising heating the squared ends 804, 806 of two pipes 800 and 802 by holding them against a heated plate 808 resulting in a melting zone 810. While the shape of the ends 804, 806 is circular, other shapes can be butt-fused. The heater plate 810 is part of a butt fusion machine 814 that is used to clamp and align the two pipes 800 and 802, followed by application of a fusion force. In FIG. 20B, the heater plate 808 is removed when a proper melt is obtained, promptly bringing the ends 804, 806 into contact together, and allowing the butt joint 812 to cool while maintaining an appropriate applied force. The butt-fusion procedure also applies to a pipe and a fitting, or two fittings.

Prior to the butt-fusion procedure shown in FIGS. 20A-20B, the surface of each end 804, 806 is abraded to square the ends and ensure that dirt and hardening along the surface of each pipe end is removed.

Various issues can occur during the creation of a butt-fusion joint. For example, the surface of one or both square ends 804, 806 can be dirty or scratched. The pipes 800 and 802 may move relative to one another prior to their cooling, or the ends 804, 806 may be misaligned when in contact. The heated surfaces of the ends 804, 806 may be allowed to unduly cool prior to joining. The appropriate joining force applied to pipes 800 and 802 may not be maintained for the prescribed period. Any of these issues can result in imperfections in the butt-fusion joint.

Figure 20C:
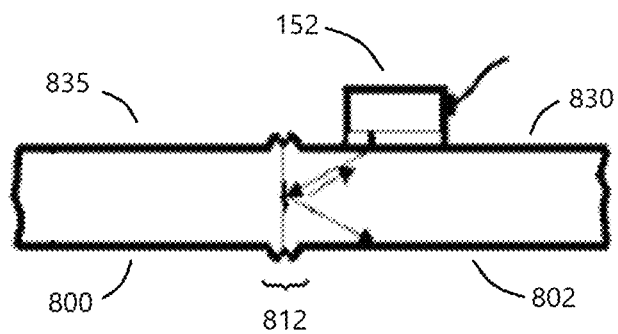
FIG. 20C shows placement of a US probe on a pair of pipes joined via butt fusion along with the direction of US beam directed at a butt fusion joint.
Figure 20D:
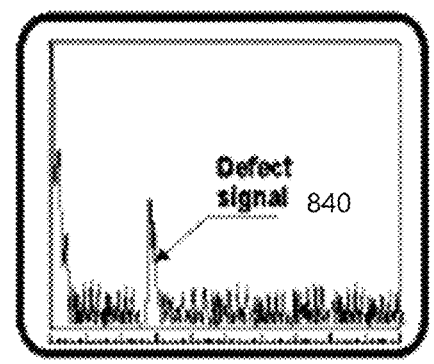
FIG. 20D shows an echo spectrum of a butt fusion joint obtained using the apparatus of FIGS. 2A and 2B.

The integrity of the butt-fusion joint 812 can then be inspected using the apparatus 100 via positioning of a US probe 152 against an outer surface 830 of pipe 802 as shown in FIG. 20C. As the joint plane is perpendicular to the surface of the pipes 800 and 802, the US signals are directed at angles oblique to the surface of the end of each pipe that is joined. An angled ultrasound transducer propagates a US signal into the material at an angle to inspect the butt-fusion region 812. This is done since the region directly above the butt-fusion is non-uniform and raised, making it difficult to propagate a US signal into the material. The US propagates through the material at an angle and reflects any defects back towards the US transducer. The rest of the US signal propagates through the material in other directions and is not be returned to the transducer. An example of a defect signal 840 is shown in FIG. 20D. This procedure can also be reproduced by placing the US probe 152 on the outer surface 835 of pipe 800 and directing oblique US signals towards the butt-fusion joint 812. As will be appreciated, butt-fusion joints have no cold zones and do not have heating wires that cause certain types of echoes in the US readings that are observed for electrofusion joints.

The apparatus 100 can be conditioned to butt-fusion joint inspecting condition and direct a user to move the US probe 152 accordingly. The butt-fusion joint has a single circumferential fusion zone to inspect in comparison to the two circumferential fusion zones in the electrofusion joint described previously. Thus, the tests are similar to that for a single side of the electrofusion joint described above.

Figure 21:
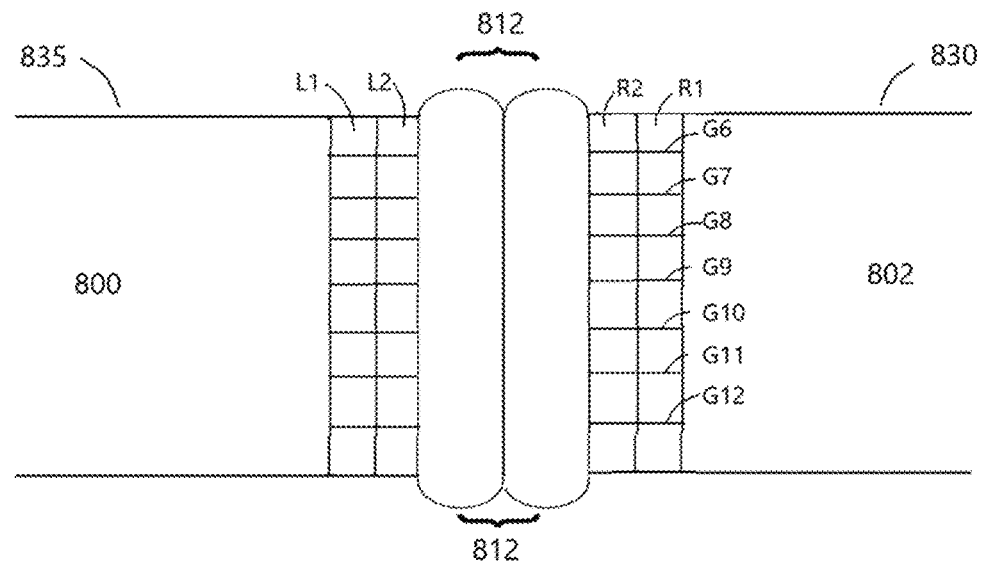
FIG. 21 illustrates an embodiment of grid lines around a butt fusion joint.

FIG. 21 illustrates longitudinal and circumferential lines drawn on the exterior surface 830, 835 of each pipe 800, 802 to demarcate US scanning positions on either side of the butt fusion joint 812.

In a first approach, the apparatus 100 may direct the user to mark locations along exterior surfaces 830 and 835. In particular, as shown in FIG. 21, the apparatus 100 may direct the user to draw twelve equally spaced longitudinal lines along the exterior surfaces 830 and 835 proximate the butt-fusion joint 812. In FIG. 21, seven of these longitudinal lines G6-G12 are visible. The longitudinal lines are parallel to a central axis of the pipes 800 and 802.

Next, the apparatus 100 may direct the user to draw central circumferential lines R1, R2, L1 and L3 about the circumference of each pipe 800 and 802, adjacent each end of the butt-fusion joint 812. In some embodiments, the number of longitudinal lines may be more or less than 16; similarly, the number of circumferential lines may be more or less than two on each pipe. Each intersection of the longitudinal and circumferential lines represents a location.

Depending on the size of the pipes 800 and 802, the apparatus 100 can direct the user to provide more or fewer longitudinal and circumferential lines to demarcate locations along the exterior surfaces 830 and 835.

As with the example of other fusion joints, echo spectra of known defects can form part of a database, against which the US spectra of a butt-fusion joint between two pipes can be compared. The butt fusion data is analyzed in a manner similar to that of electrofusion. The aggregate data of a butt-fusion joint is examined for voids and patterns of defects. In some embodiments, patterns may include a certain percentage of negative readings in quadrants; percentage of negative readings in rows; and/or percentage of negative readings overall.

With reference to FIG. 3, the aggregate data of scanning locations is analyzed at step 260 to see if the joint is rejected. If the joint is not rejected, further US scanning positions are scanned unless there are no more to scan.

Saddle Electrofusion

Figure 22A:
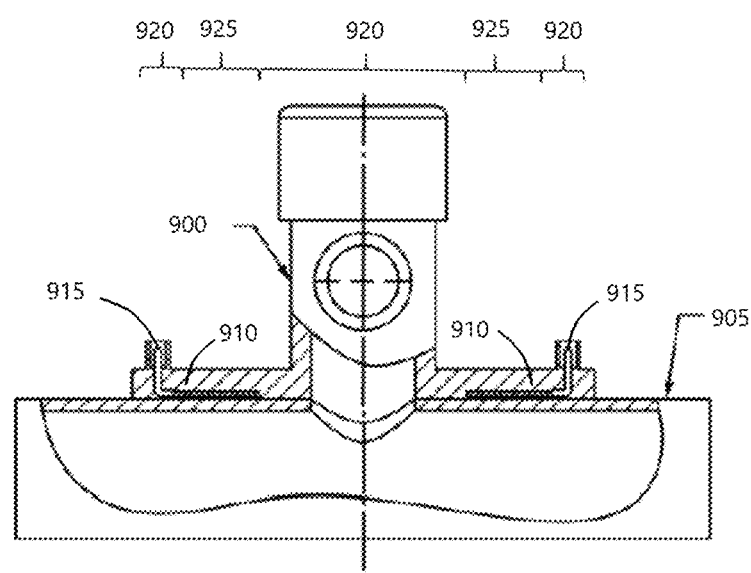
FIG. 22A shows a front cutaway view of an electrofusion saddle joint.

Electrofusion saddle joints can also be inspected with the apparatus 100. FIG. 22A illustrates a front cut-away view of an electrofusion saddle 900 applied to a pipe 905. Similar to FIG. 1B, the electrofusion saddle joint is formed by heating wires 910 that are connected to electrical connectors 915. As in FIG. 1B, the electrofusion saddle joint has cold zones 920 where no heating between the saddle 900 and an outside surface of the pipe 905 takes place; and fusion zones 920 where heating takes place (due to the heating wires 910) to fuse the electrofusion saddle 900 with the pipe 905.

Figure 22B:
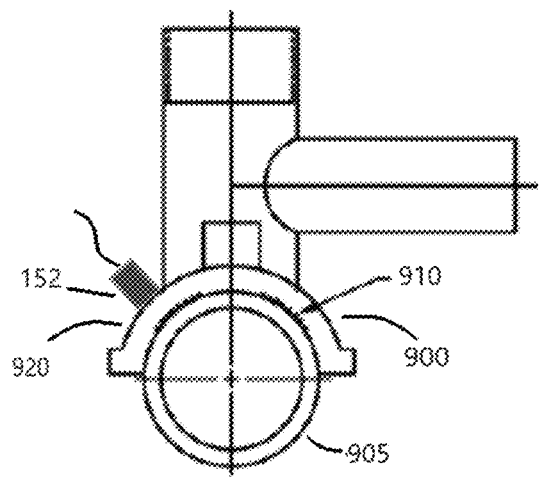
FIG. 22B shows a side sectional view of a US probe on the electrofusion saddle shown in FIG. 22A.

FIG. 22B illustrates a cut-away side view of the placement of a US probe 152 on an outside surface 920 of the electrofusion saddle 900 when operating the apparatus 100, using, for example, the method described in the flowchart of FIG. 3.

Figure 22C:
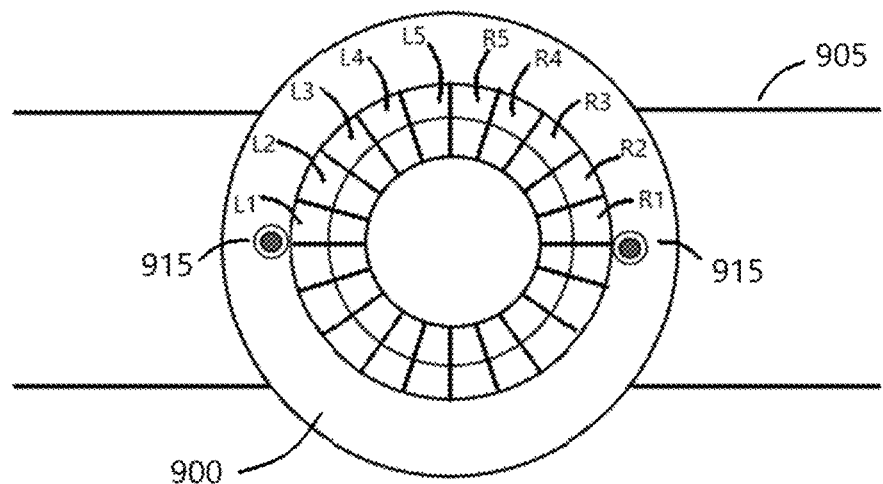
FIG. 22C illustrates an embodiment of grid lines around the electrofusion saddle joint in FIGS. 22A and 22B.

FIG. 22C illustrates a series of grid lines L1-L5 and R1-R5 provided by the apparatus 100, which define a series of cells. In accordance with the embodiment of FIG. 3, the apparatus selects an initial set of US scanning positions from among these cells. The electrofusion saddle joint can be analyzed by the embodiment shown in FIG. 3.

Other types of heat fusion joints that can be inspected using the general approach identified above will occur to those skilled in the art.

By selecting an initial set of US scanning positions and terminating the scanning of positions prior to the scanning of all scanning positions identified for scanning, user time spent, and apparatus power consumption can be reduced. Further, by selectively adding additional US scanning positions as required, anomalies can be investigated in an efficient manner and with less skill than otherwise required.

While the use of the apparatus was described in above embodiments for plastic pipes and fittings, it is contemplated that the apparatus can be used for other types of joints. For example, in some scenarios, joints with one or more metal components can be inspected using the apparatus described above. Other types of joints will occur to those skilled in the art.

Computer-executable instructions for implementing the joint fusion inspecting method on a computer system could be provided separately from the computer system, for example, on a computer-readable medium (such as, for example, an optical disk, a hard disk, a USB drive or a media card) or by making them available for downloading over a communications network, such as the Internet.

While the computer system is shown as a single physical computer, it will be appreciated that the computer system can include two or more physical computers in communication with each other. Accordingly, while the embodiment shows the various components of the computer system residing on the same physical computer, those skilled in the art will appreciate that the components can reside on separate physical computers.

Persons skilled in the art will appreciate that there are yet more alternative implementations and modifications possible, and that the above examples are only illustrations of one or more implementations. The scope, therefore, is only to be limited by the claims appended hereto and any amendments made thereto.

LIST OF REFERENCE NUMERALS 20 electrofusion coupling joint
24 pipe
26 interior pipe surface
28 exterior pipe surface
32 electrofusion fitting
36 interior electrofusion fitting surface
40 exterior electrofusion fitting surface
44 ridge
48 gap
52 heating wire
56 fusion zone
60 cold zone
64 electrical connector
100 an apparatus embodiment
104 computing device
108 display
112 user input interface
116 keyboard
120 trackpad
124 CPU
128 RAM
132 audio speaker
136 network interface
140 non-volatile memory
144 local bus
148 rule database
152 US probe
G4 longitudinal line
G8 longitudinal line
CA central axis
L1 circumferential line
L2 circumferential line
L3 circumferential line
L4/R4 circumferential line
R1 circumferential line
R2 circumferential line
R3 circumferential line
200 method of inspecting a fusion joint
210 receive information about fusion joint and US probe
220 provide initial set of US scanning locations
230 Perform scan and receive data for US scanning location
240 classify US scanning location
245 Classification good?
250 Add new US scanning locations nearby
255 Apply subtests to scanned locations
260 joint rejected?
265 Alert user
280 remaining locations to scan?
300 graphical user interface
304 US pulse-echo spectrum
308 reference US pulse-echo spectrum
312 joint map 314 cold zone scanning position
316 result indicator
318 center zone position
320 scanning position
400 typical US pulse-echo spectrum
404 preliminary US pulse echoes
408 first set of observed US pulse echoes
412 first US spectrum range
416 second set of observed US pulse echoes
420 second US spectrum range
424 interrupted US pulse-echo spectrum
432 first set of observed US pulse echoes
436 second set of observed US pulse echoes
440 typical US pulse-echo spectrum having a water/pocket void
444 first set of observed US pulse echoes
448 second set of observed US pulse echoes
452 typical US pulse-echo spectrum having contamination in the electrofusion coupling joint
456 first set of observed US pulse echoes
460 second set of observed US pulse echoes
464 typical US pulse-echo spectrum of misaligned electrofusion coupling joint
468 first set of observed US pulse echoes
472 second set of observed US pulse echoes
476 typical US pulse-echo spectrum of electrofusion coupling joint where pipe is under-inserted
480 first set of observed US pulse echoes
484 second set of observed US pulse echoes
488 typical US pulse-echo spectrum of over-scraped pipe
492 first set of observed US pulse echoes
496 second set of observed US pulse echoes
500 typical US pulse-echo spectrum of oxidized pipe
504 first set of observed US pulse echoes
508 second set of observed US pulse echoes
512 typical US pulse-echo spectrum having a void
516 first set of observed US pulse echoes
520 second set of observed US pulse echoes
525 joint map
600 pipe
604 socket joint fitting
608 collar
612 opening
616 internal annular surface
620 exterior surface
624 socket joint tool
628 interior annular heating surface
632 exterior cylindrical heating surface
636 outer surface
700 pipe
704 tee joint fitting
708 arcuate flange
712 arcuate surface
716 exterior surface
720 saddle joint tool
724 convex heating surface
728 concave heating surface
732 outer surface
800 pipe
802 pipe
804 pipe end
806 pipe end
808 hot plate
810 melting zone
812 butt-fusion joint
830 outer surface of pipe
835 outer surface of pipe
840 defect signal
900 electrofusion saddle
905 pipe
910 heating wires
915 electrical connector
920 cold zone
925 fusion zone

What is claimed is:

1. An apparatus for inspecting a fusion joint, the apparatus comprising: an ultrasound ("US") probe; and
a processor in communication with the US probe, the processor configured to:
measure, via the US probe, a US pulse-echo spectrum from one or more US scanning positions of an initial subset of US scanning positions from a predetermined set of US scanning positions about the fusion joint;
measure, via the US probe, a US pulse-echo spectrum from one or more new US scanning positions selected from predetermined US scanning positions adjacent at least one US scanning position having a measured US echo-spectrum classified as anomalous; and
evaluate an aggregate of the measured US pulse-echo spectrums to determine if the fusion joint is defective.

2. The apparatus as claimed in claim 1, wherein the processor is further configured to:
select the initial subset of US scanning positions from the predetermined set of US scanning positions; and
classify each measured US pulse echo spectrum with use of one or more known US pulse echo spectrums.

3. The apparatus as claimed in claim 2 further comprising:
a database storing classification rules;
wherein the processor selects the initial subset of US scanning positions with use of information related to at least one of the US probe and the fusion joint, and wherein the processor's classifying each measured US pulse echo spectrum includes:
comparing each measured US pulse echo spectrum with said one or more US pulse echo spectrums generating a comparison; and
classifying each measured pulse echo spectrum with use of the comparison and the classification rules.

4. The apparatus as claimed in claim 1, wherein at least one adjacent pair of the initial US scanning positions is separated by at least one width of an US beam generated by the US probe.

5. The apparatus as claimed in claim 1, wherein the processor is further configured to determine the fusion joint is not defective in a case of every US scanning position of the initial subset of US scanning positions having a measured US echo-spectrum classified as good.

6. The apparatus as claimed in claim 1, wherein a beam of the US probe is perpendicular or oblique to the fusion joint.

7. The apparatus as claimed in claim 1, wherein the processor is further configured to analyze the US pulse-echo spectrums of the US scanning positions in a longitudinal row extending axially along the fusion joint to determine if the fusion joint is defective.

8. The apparatus as claimed in claim 1, wherein the processor is further configured to identify a void in the fusion joint or identify and estimate a size of a void in the fusion joint.

9. The apparatus as claimed in claim 1, wherein the fusion joint is selected from the group consisting of an electrofusion joint, a butt-fusion joint and a saddle joint.

10. The apparatus as claimed in claim 9, wherein the electrofusion joint is an electrofusion coupling joint, an electrofusion saddle joint, an electrofusion elbow joint or an electrofusion tee joint.

11. The apparatus as claimed in claim 9, wherein the fusion joint is an electrofusion coupling joint or an electrofusion saddle joint; and the processor is further configured to analyze the measured US pulse-echo spectrums in at least one of a fusion zone and a cold zone to determine if the fusion joint is defective.

12. The apparatus as claimed in claim 9, wherein:
the fusion joint is an electrofusion coupling joint; and
the processor is further configured to analyze the measured US pulse-echo spectrums from US scanning positions in a quadrant representing a portion of the electrofusion coupling joint between a fusion fitting and one of the pipes joined in the electrofusion coupling fusion joint in which heating wires are located, to determine if the fusion joint is defective.

13. The apparatus as claimed in claim 1, wherein evaluation of the aggregate is based on a plurality of sub-tests applied to values assigned to the measured US pulse-echo spectrums.

14. The apparatus as claimed in claim 13, wherein the number of sub-tests is between four and ten.

15. The apparatus as claimed in claim 14, wherein the number of sub-tests is six.

16. The apparatus as claimed in claim 1 further comprising a display; and wherein the processor is further configured to identify the initial subset of US scanning positions to a user via the display.

17. A method for inspecting a fusion joint, comprising:
measuring, via a US probe, a US pulse-echo spectrum from one or more US scanning positions of an initial subset of US scanning positions from a predetermined set of US scanning positions about the fusion joint;
measuring, via the US probe, a US pulse-echo spectrum from one or more new US scanning positions selected from predetermined US scanning positions adjacent at least one US scanning position having a measured US echo-spectrum classified as anomalous; and
evaluating, by the processor, an aggregate of the measured US pulse-echo spectrums to determine if the fusion joint is defective.

18. The method of claim 17, further comprising:
selecting, by the processor, the initial subset of US scanning positions from the predetermined set of US scanning positions; and
classifying, by the processor, each measured US pulse echo spectrum with use of one or more known US pulse echo spectrums.

19. The method of claim 18, wherein selecting, by the processor, the initial subset of US scanning positions is performed with use of information related to at least one of the US probe and the fusion joint, and wherein the classifying, by the processor, each measured US pulse echo spectrum includes:
comparing each measured US pulse echo spectrum with said one or more US pulse echo spectrums generating a comparison; and
classifying each measured pulse echo spectrum with use of the comparison and the classification rules.

20. The method as claimed in claim 17, wherein at least one adjacent pair of the initial US scanning positions is separated by at least one width of an US beam generated by the US probe.

21. The method as claimed in claim 17 further comprising determining, by the processor, that the fusion joint is not defective in a case of every US scanning position of the initial subset of US scanning positions having a measured US echo-spectrum classified as good.

22. The method as claimed in claim 17, wherein a beam of the US probe is perpendicular or oblique to the fusion joint.

23. The method as claimed in claim 17, wherein the US pulse-echo spectrums of the US scanning positions in a longitudinal row extending axially along the fusion joint are analyzed by the processor, to determine if the fusion joint is defective.

24. The method as claimed in claim 17, further comprising identifying a void in the fusion joint or identifying and estimating a size of a void in the fusion joint, by the processor.

25. The method as claimed in claim 17, wherein the fusion joint is selected from the group consisting of an electrofusion joint, a butt-fusion joint and a saddle joint.

26. The method as claimed in claim 25, wherein the electrofusion joint is an electrofusion coupling joint, an electrofusion saddle joint, an electrofusion elbow joint or an electrofusion tee joint.

27. The method as claimed in claim 25, wherein the fusion joint is an electrofusion coupling joint or an electrofusion saddle joint; and the method further comprises analysis, by the processor, of the measured US pulse-echo spectrums in at least one of a fusion zone and a cold zone to determine if the fusion joint is defective.

28. The method as claimed in claim 25, wherein:
the fusion joint is an electrofusion coupling joint; and
the method further comprises analysis, by the processor, of the measured US pulse-echo spectrums in a quadrant representing a portion of the electrofusion coupling joint between a fusion fitting and one of the pipes joined in the electrofusion coupling joint in which heating wires are located, to determine if the fusion joint is defective.

29. The method as claimed in claim 17, wherein evaluation of the aggregate is based on a plurality of sub-tests applied to values assigned to the measured US pulse-echo spectrums.

* * * * *